US005829032A

United States Patent [19]
Komuro et al.

[11] Patent Number: 5,829,032
[45] Date of Patent: *Oct. 27, 1998

[54] MULTIPROCESSOR SYSTEM

[75] Inventors: Hiroshi Komuro, Sayama; Hiroo Hayashi; Nobuhiko Yamagami, both of Tokyo, all of Japan

[73] Assignee: Kabushiki Kaisha Toshiba, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 550,403

[22] Filed: Oct. 30, 1995

[30] Foreign Application Priority Data

Oct. 31, 1994 [JP] Japan .................. 6-267770
Jun. 19, 1995 [JP] Japan .................. 7-151738

[51] Int. Cl.⁶ ........................................ G06F 12/08
[52] U.S. Cl. ............................. 711/141; 711/117
[58] Field of Search ................... 395/800; 711/141, 711/117

[56] References Cited

U.S. PATENT DOCUMENTS

| | | | |
|---|---|---|---|
| 4,622,631 | 11/1986 | Frank ........................... | 395/375 |
| 5,058,006 | 10/1991 | Durdan et al. ................ | 711/122 |
| 5,222,224 | 6/1993 | Flynn ........................... | 395/425 |
| 5,230,070 | 7/1993 | Liu ............................... | 395/425 |
| 5,303,362 | 4/1994 | Butts, Jr. et al. ............. | 711/131 |
| 5,319,766 | 6/1994 | Thaller et al. ................ | 711/146 |
| 5,327,570 | 7/1994 | Foster ........................... | 395/800 |
| 5,375,220 | 12/1994 | Ishikawa ..................... | 395/425 |
| 5,537,574 | 7/1996 | Elko ............................. | 395/468 |
| 5,692,149 | 11/1997 | Lee .............................. | 395/460 |

*Primary Examiner*—Eric Coleman
*Attorney, Agent, or Firm*—Finnegan, Henderson, Farabow, Garrett & Dunner, L.L.P.

[57] ABSTRACT

As much tag information as corresponds to the number of blocks stored in main memories is stored in tag memories. The tag information indicates whether or not a processor belonging to a node other than the nodes containing tag memories has made an access request and the contents of a cache have been rewritten. Bus bridges perform cache coherency control, referring to the tag information. When the tag information indicates "Modified," the bus bridges stop the data read from the main memories and send the correct data to the requesting processor after a copy-back process of the modified block has been completed.

18 Claims, 16 Drawing Sheets

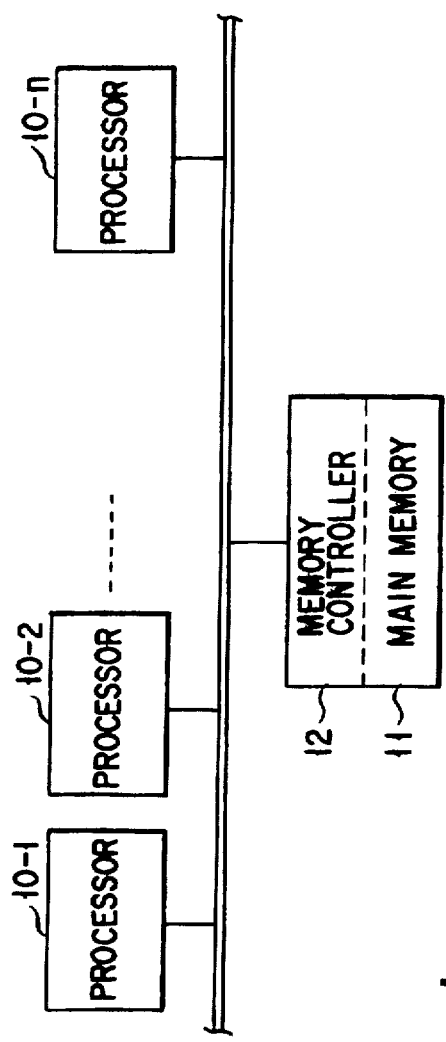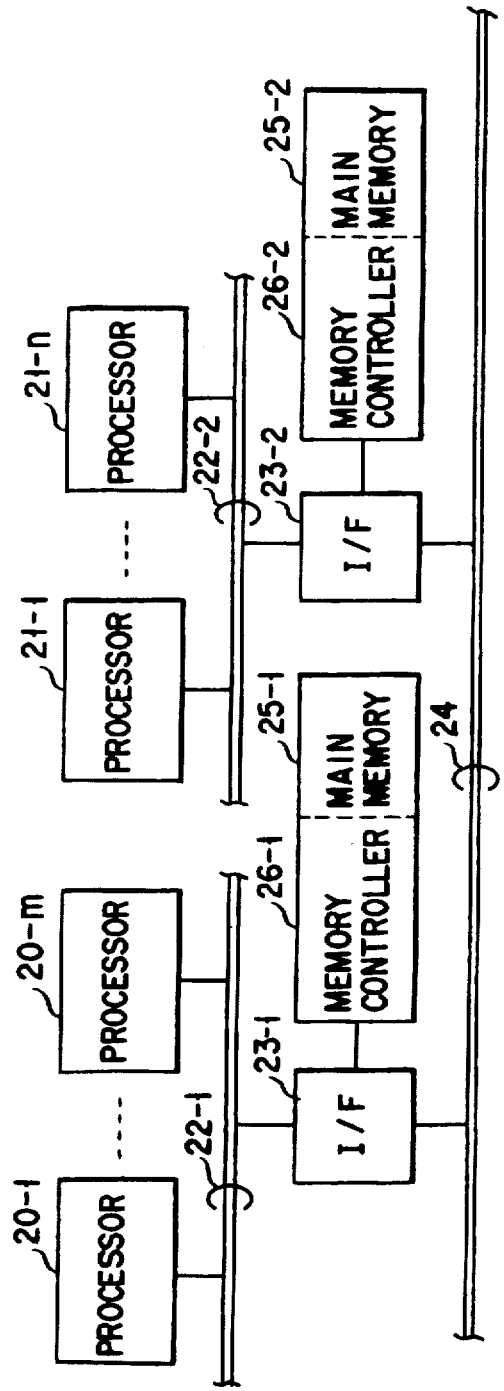

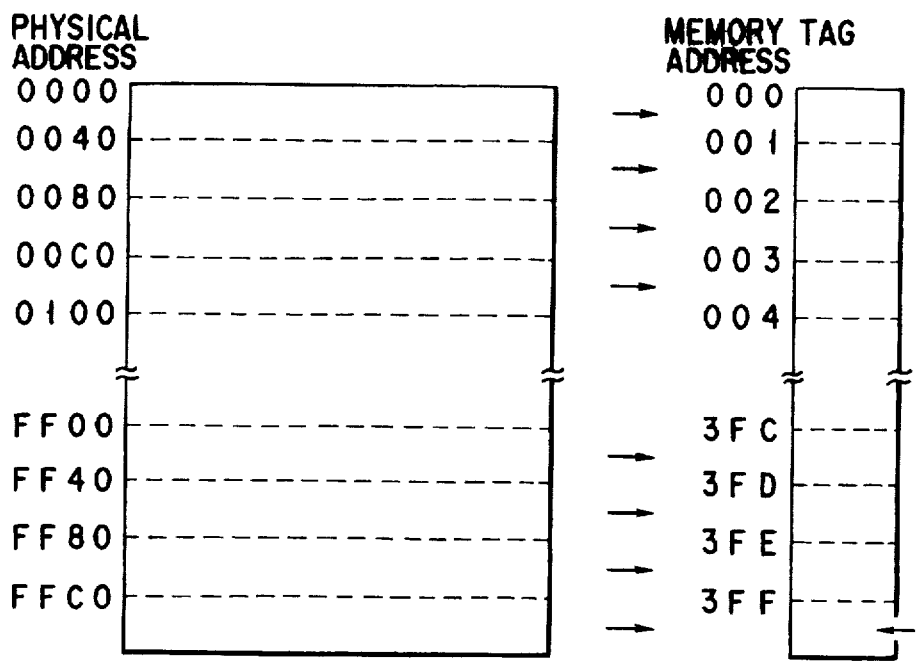
F I G. 6
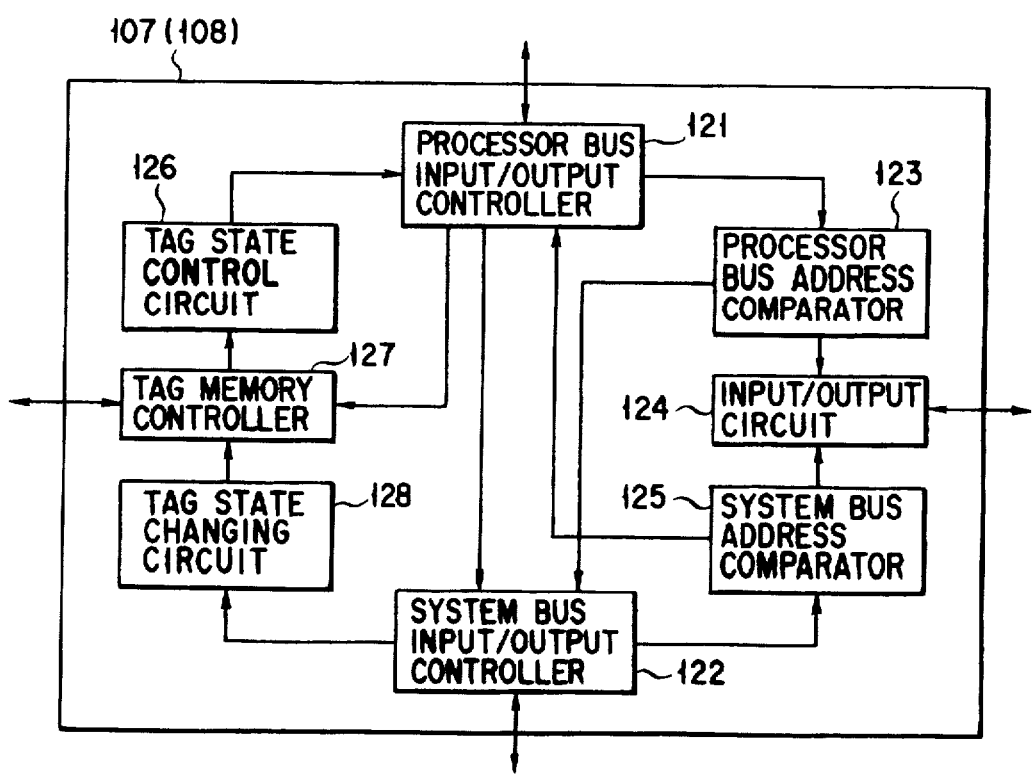
F I G. 7

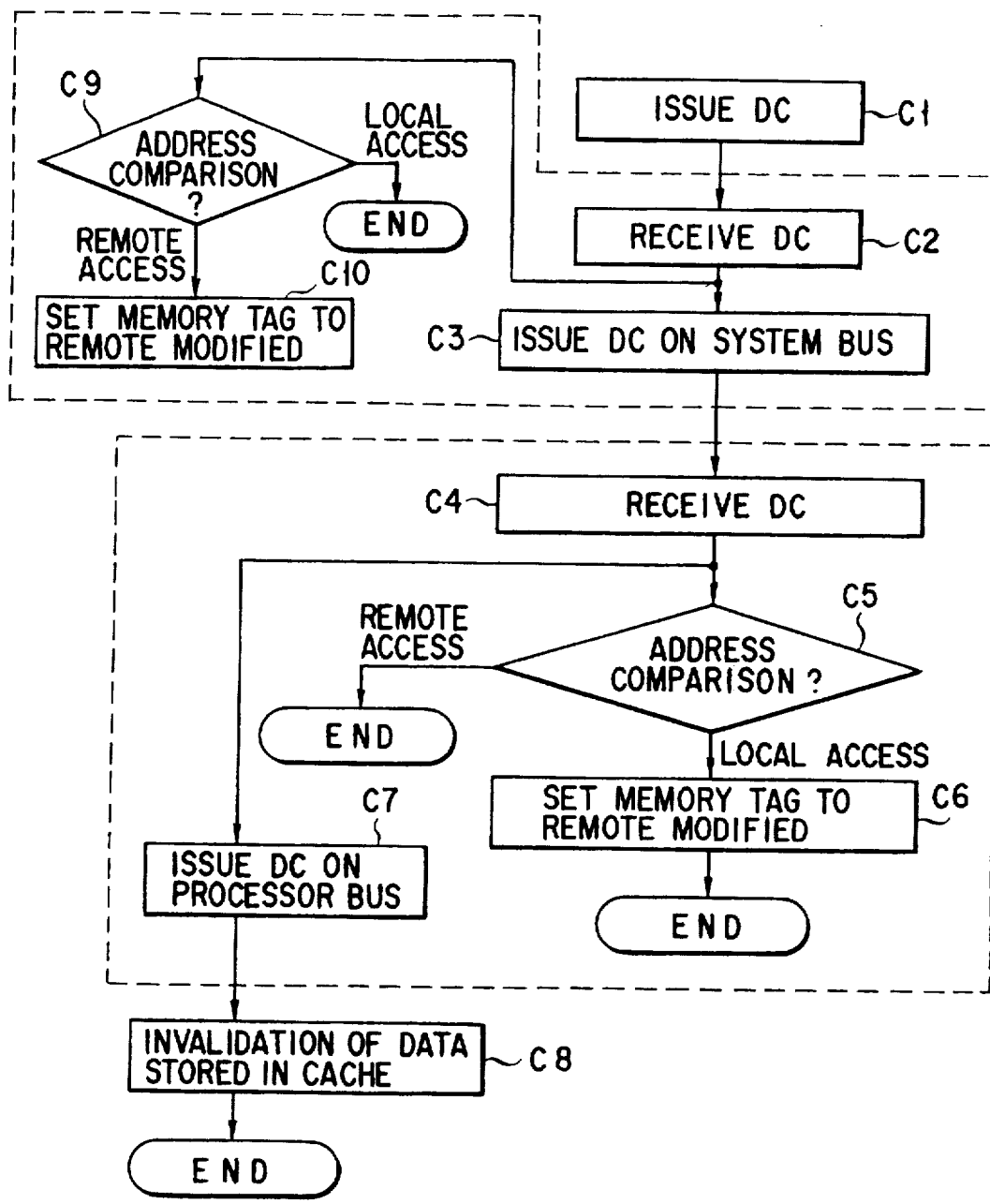
F I G. 10

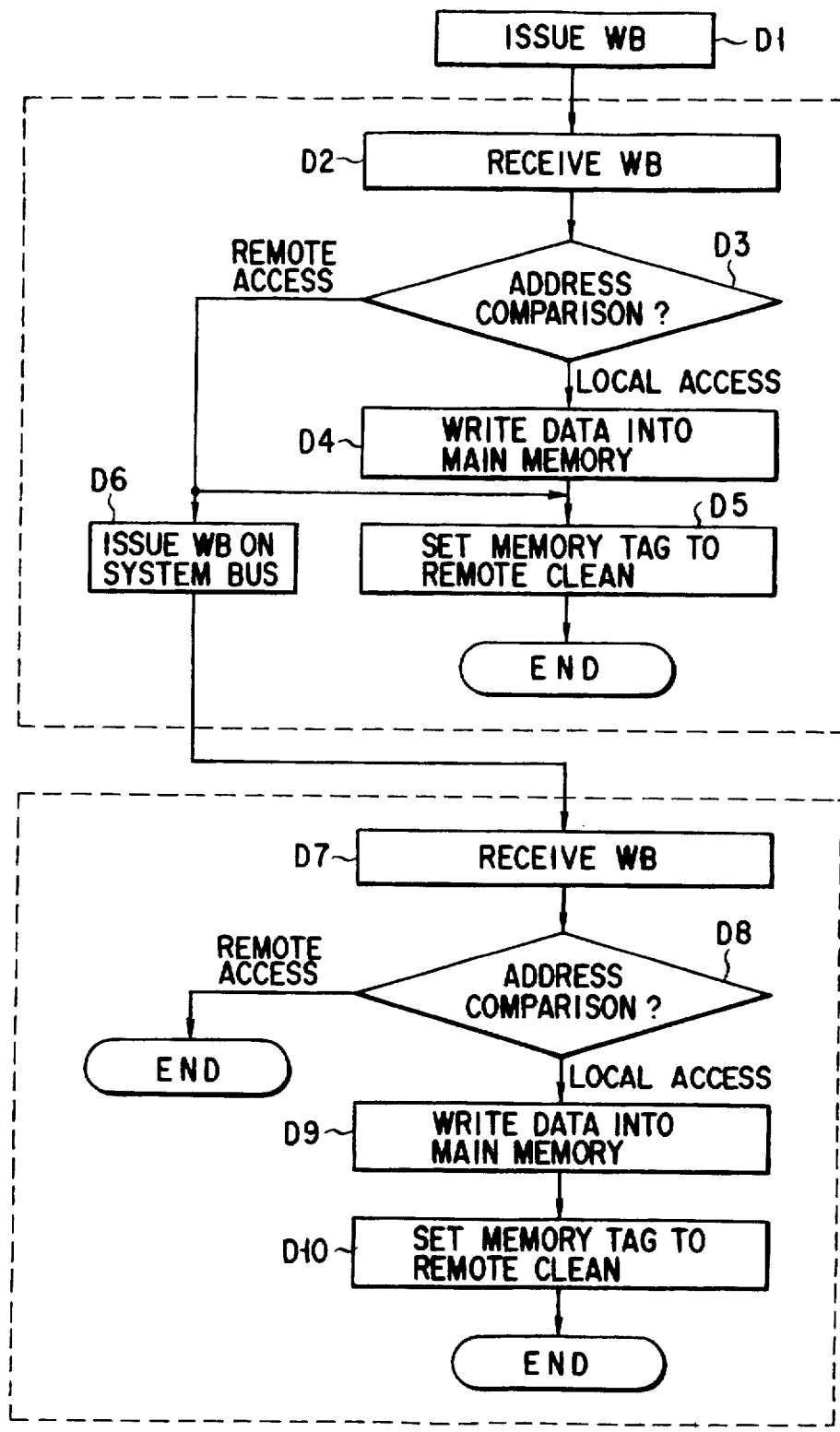
F I G. 11

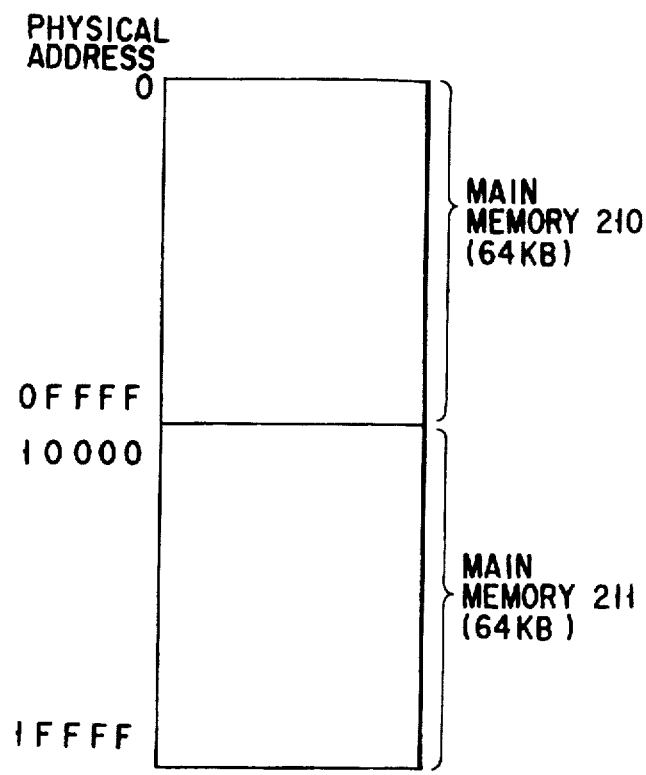
F I G. 13
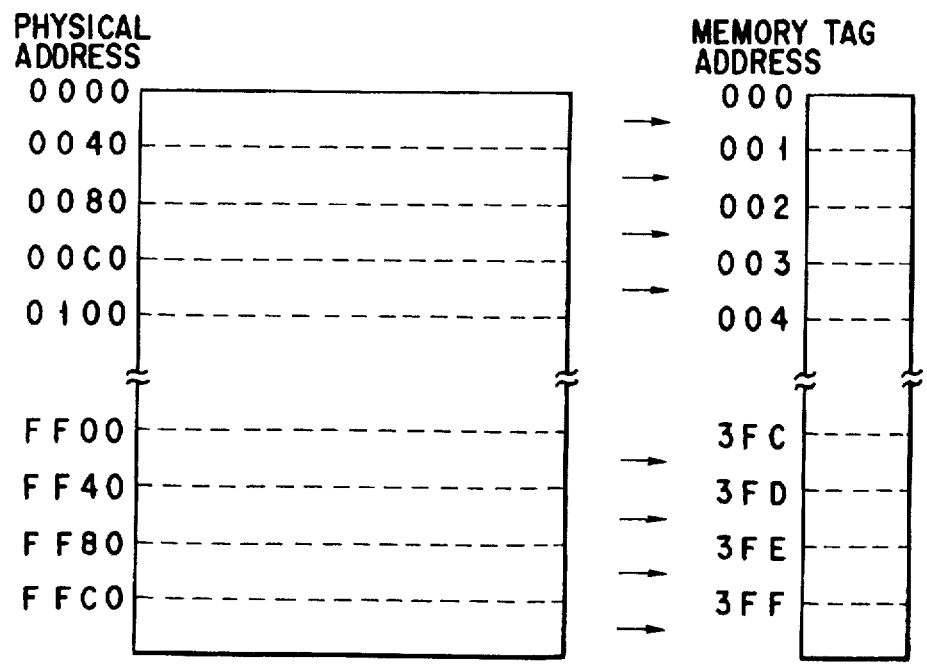
F I G. 14

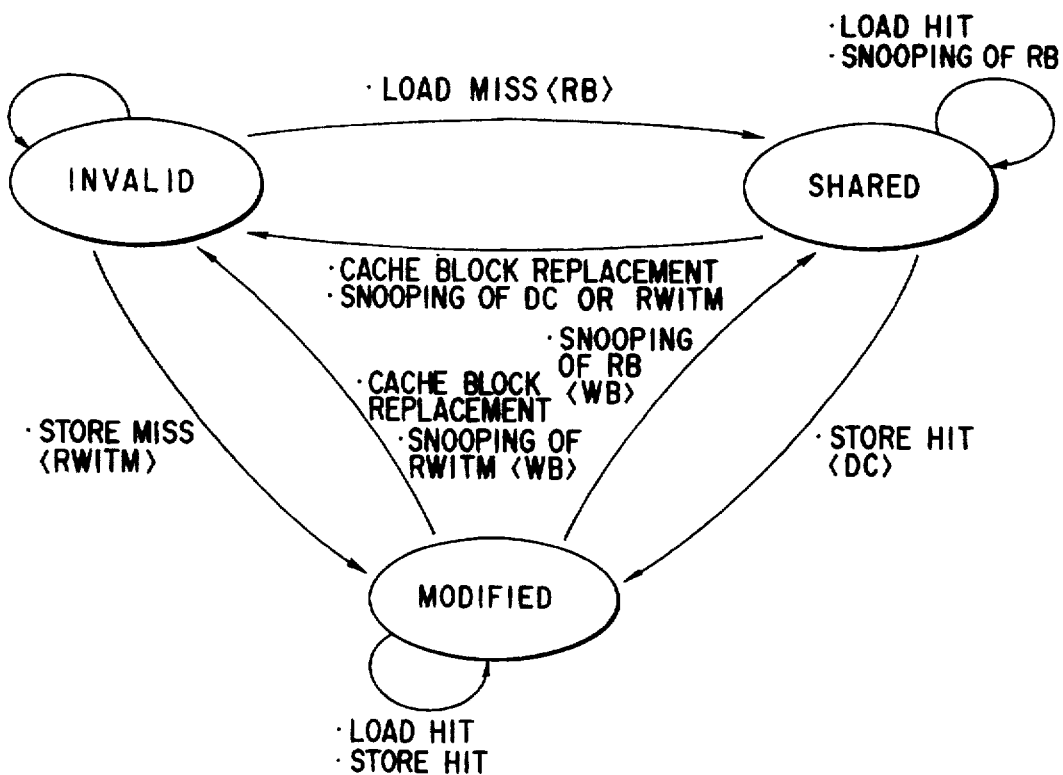
F I G. 16
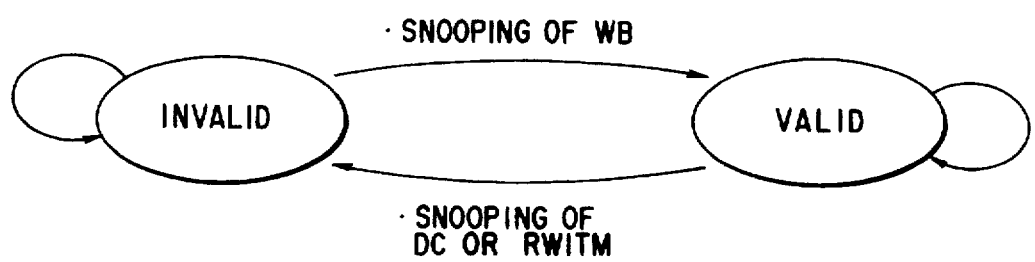
F I G. 17

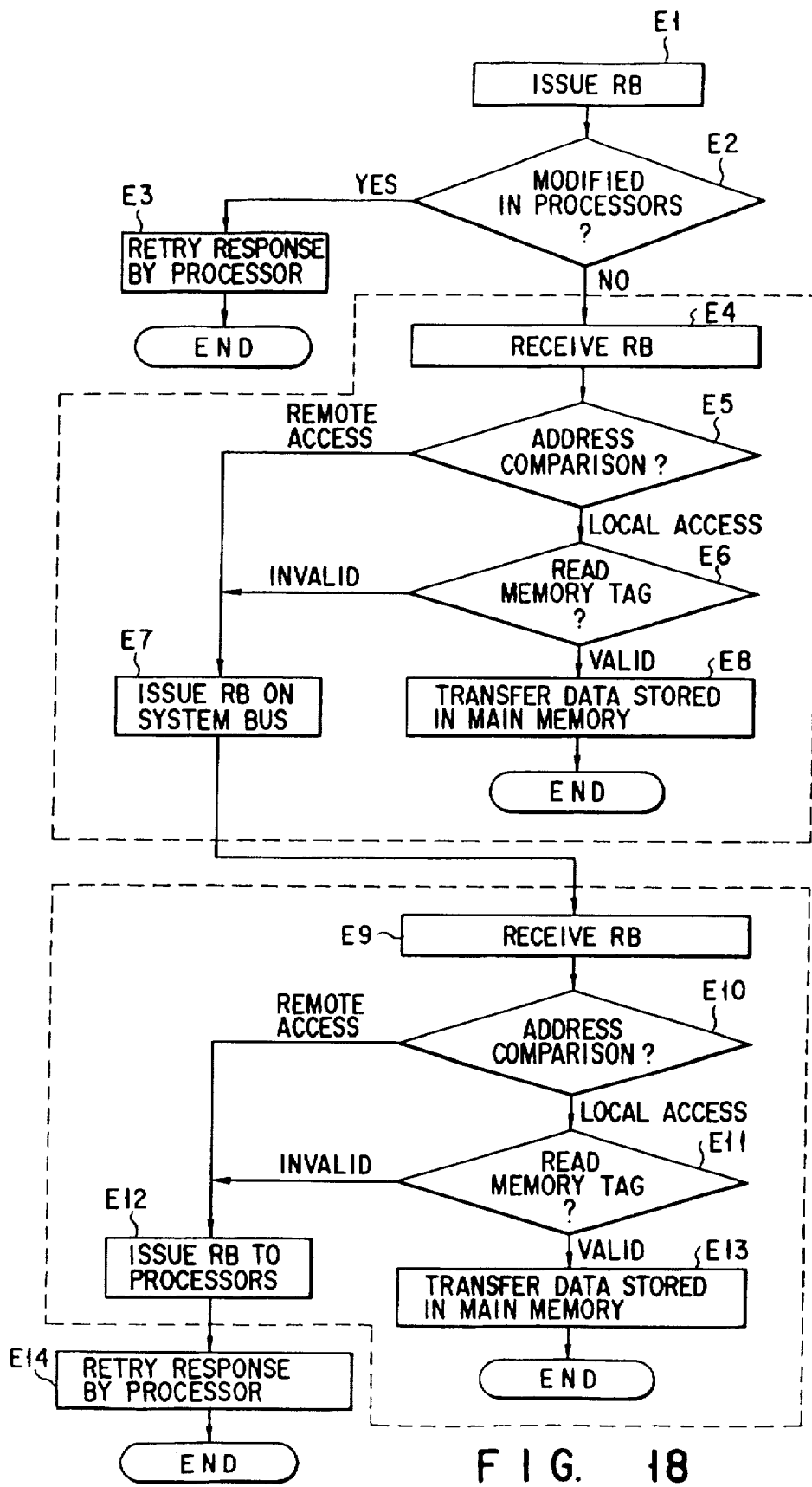
F I G. 18

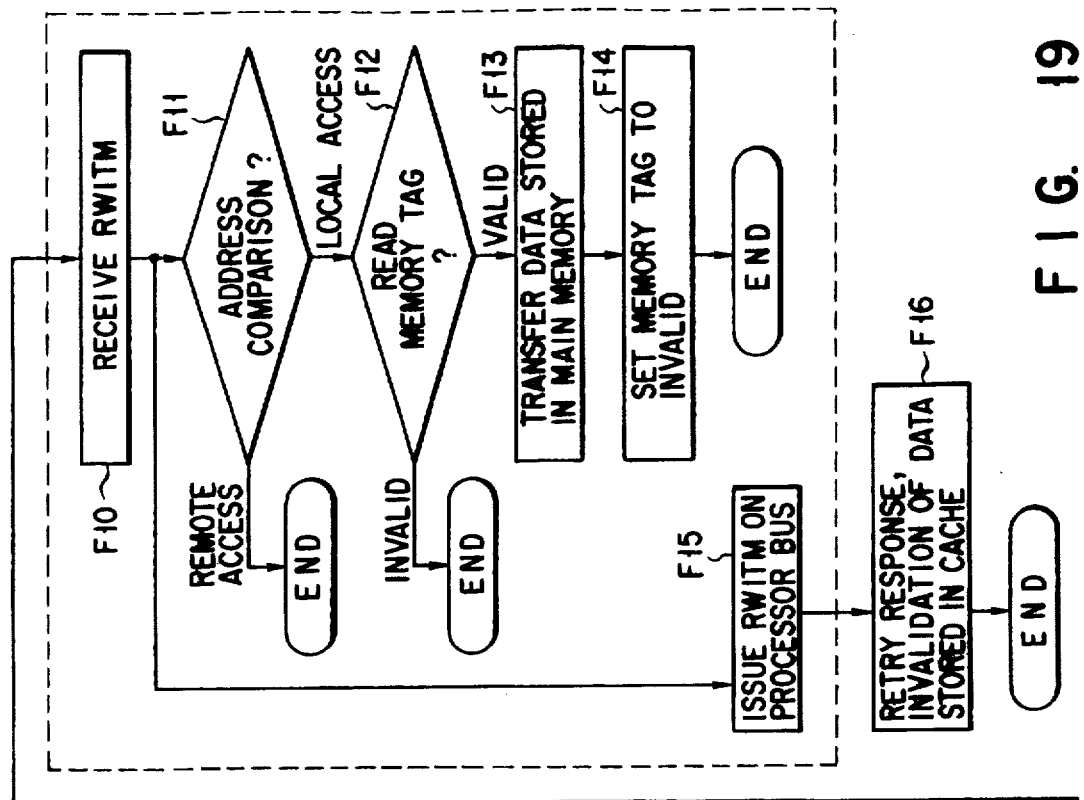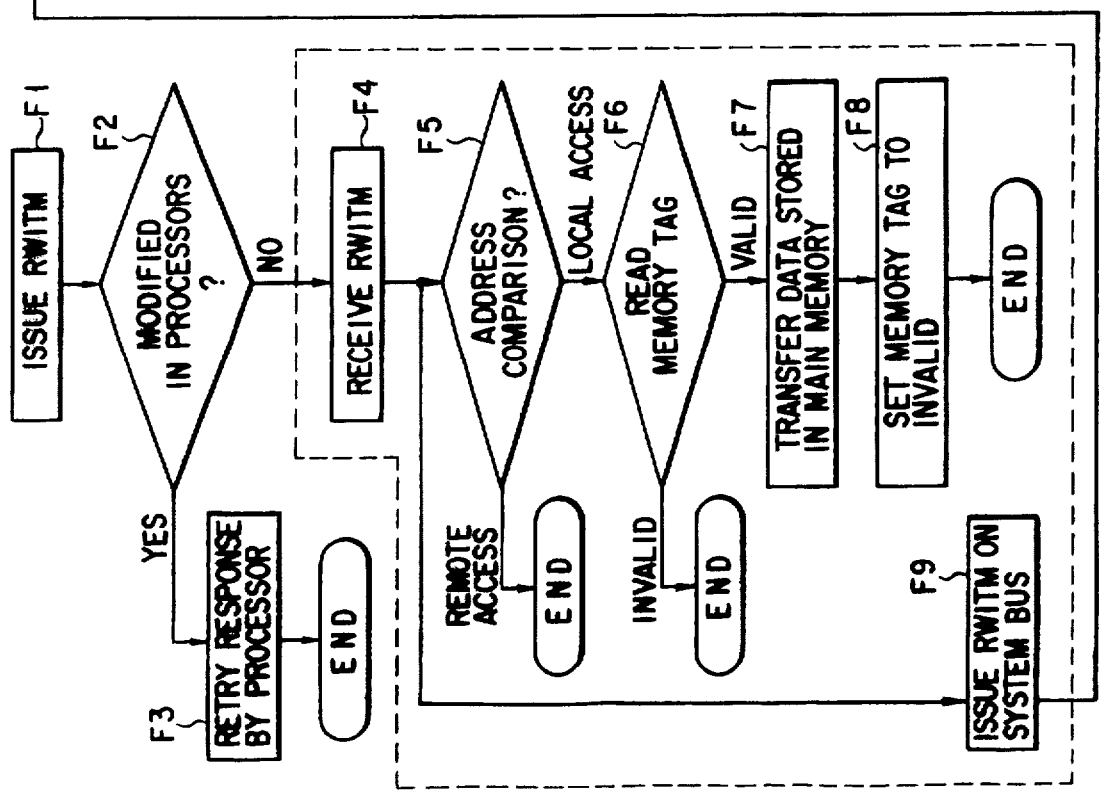
FIG. 19

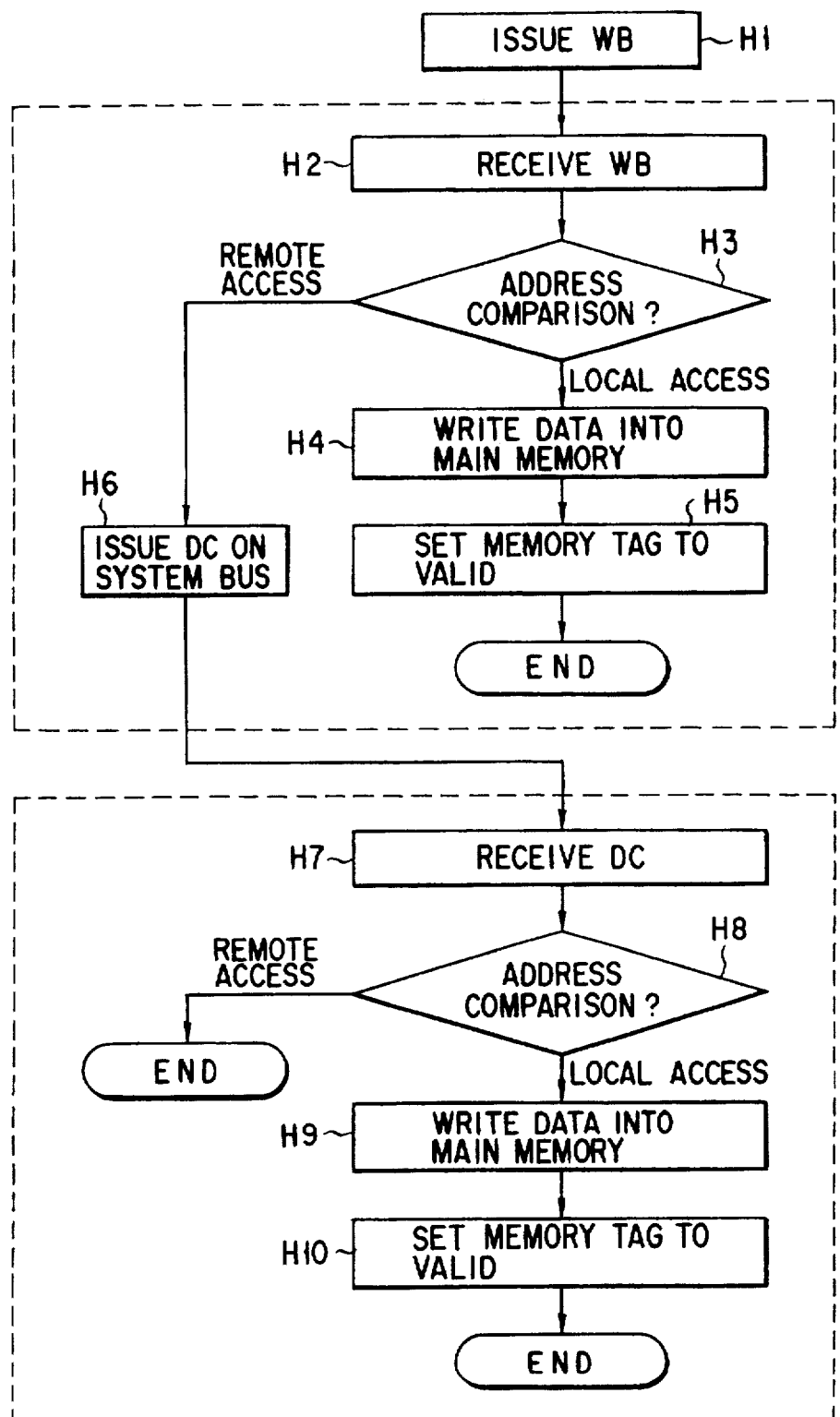
F I G. 21

MULTIPROCESSOR SYSTEM

BACKGROUND OF THE INVENTION

1. Field of the Invention

This invention relates to a multiprocessor system containing distributed shared memories and a plurality of processors incorporating cache memories each connected to an internal bus, and more particularly to a multiprocessor system that can optimally execute coherency control of the data stored in the main memories and the cache memories of the individual processors.

2. Description of the Related Art

In a multiprocessor system where a plurality of processors operate concurrently, the main memory that stores programs and data is usually connected to the processors as shown in FIG. 1. In the connection layout shown in FIG. 1, a plurality of processors 10-1 to 10-n (n>1) share a single main memory 11, to which a memory controller 12 that performs a process according to an access request is also connected. This enables a response to be returned to the requesting processors 10-1 to 10-n with constant latency, not depending on the requesting processor 10-1 to 10-n so long as there is no request contention on the bus. A memory subsystem with constant memory access latency is called UMA (Uniform Memory Access).

This technique has the advantage that a system can be implemented easily, but has disadvantages in that the memory access latency increases due to the rapidly improved performance of the processors and that the limited bandwidth of the bus restricts the maximum number of processors.

To solve the aforementioned drawbacks, a Distributed Shared Memory system and a multi-level cache memory system have been proposed. FIG. 2 shows the connection layout of a Distributed Shared Memory system. In this connection layout, a group of processors 20-1 to 20-m and a group of processors 21-1 to 21-n are connected to different processor buses 22-1 and 22-2, respectively (m>1, n>1). These processor buses 22-1 and 22-2 are connected to the system bus 24 via interfaces 23-1 and 23-2, respectively. This enables the data exchange between the processors 20-1 to 20-m and the processors 21-1 to 21-n. Main memories 25-1 and 25-2 are connected to the interfaces 23-1 and 23-2 via memory controllers 26-1 and 26-2, respectively. Although the main memories 25-1, 25-2 are distributed, the individual processors can access them as if they accessed the main memory 11 shown in FIG. 1. A main memory with such a configuration is called a Distributed Shared Memory. FIG. 2 shows a case where two nodes are provided, each of which is composed of one or more processors, a processor bus, an interface, and a main memory.

In a multiprocessor system to which the Distributed Shared Memory is applied, the latency of a memory access differs depending on the main memory required to be accessed. A memory subsystem with different memory access latency is called NUMA (Non-Uniform Memory Access).

In a distributed shared memory system, cache coherency is difficult to maintain efficiently. In a multiprocessor system with a single-bus, cache coherency is maintained by snooping transactions on the processor bus. A distributed shared memory system with a plurality of buses needs cache coherency control over all the buses. This causes the disadvantage that the memory access latency becomes large.

FIG. 3 shows the connection layout of a multi-level cache memory system in which the system bus is provided with a cache having a large storage capacity. In the figure, reference symbols 30-1 to 30-m, 31-1 to 31-n indicate processors, 32-1 and 32-2 processor buses, 33-1 and 33-2 interfaces, 34 a system bus, 35-1 and 35-2 main memories, and 36-1 and 36-2 memory controllers. The connection of these component parts is similar to that of the multiprocessor system shown in FIG. 2. In the multiprocessor system shown in FIG. 3, level-3 (L3) cache memories are connected to the interfaces 33-1 and 33-2, respectively.

Present-day processors contain high-speed on-chip caches with a storage capacity of several KB synchronizing with the frequency of the processors. These caches are called level-1 (L1) caches. In addition, outside the processor, memory elements such as SRAMs (Static Random Access Memories) are provided, thereby achieving level-2 (L2) caches with a storage capacity of several hundred KB or so. The L2 cache is slower than the L1 cache but has a larger storage capacity.

The configuration of the processor 30 provided with the L1 cache and L2 cache is shown in FIG. 4. As described above, the L1 cache 38 is provided within the processor 30. An L2 cache controller 40 for controlling the L2 cache 39 is also provided within the processor 30. Although not shown in the figure, the processors 30-1 to 30-m, 31-1 to 31-n shown in FIG. 3 contain the L1 caches and the L2 caches shown in FIG. 4.

In the multiprocessor system shown in FIG. 3, the L3 caches operate so that the cache coherency is maintained with the L1 and L2 caches on the processor bus side. For example, when the L1 or L2 cache block become invalidated, the same block in the L3 cache also becomes invalidated. The L3 cache has a snooping mechanism on the system bus and thereby achieves coherency control of the caches in all of the processors.

In general, the L3 cache has a storage capacity ten or more times that of the L2 cache. Namely, the L3 cache is made up of a memory (normally, an SRAM) with a storage capacity of several tens MB) and achieves the aforementioned function resulting in a very expensive system configuration.

Furthermore, the L3 cache needs a coherency control circuit for the processor buses and the system bus. The L3 cache has a disadvantage in that when a processor reads data from the main memory, whether the data read from the main memory is valid or invalid cannot be judged before the other L3 caches make any response.

SUMMARY OF THE INVENTION

The object of the present invention is to provide a memory subsystem which enables not only efficient coherency control of caches, but also high-speed access to the main memories.

According to a first aspect of the present invention, there is provided a multiprocessor system comprising: a plurality of nodes; and a bus for connecting the plurality of nodes to each other, wherein each of the plurality of nodes comprises: one or more processors having cache memories; a memory that is allocated a specific part of an address space shared by the plurality of nodes and stores data; a tag memory for storing tag data, the tag data indicating Modified to or not Modified to or free from any one of the processors contained in the plurality of nodes except for the nodes having the tag memory for each item of all the data stored in the memories contained in the plurality of nodes; judging means that, in response to a data access request issued from any one of the one or more processors, judges whether or not the access request is contained in a specific part of the address space; and control means that, according to at least one of the judgment at the judging means and the tag data stored in the tag memory, performs a control process of the data for which the access request has been made.

According to a second aspect of the present invention, there is provided a multiprocessor system comprising: a plurality of nodes; and a bus for connecting the plurality of nodes to each other, wherein each of the plurality of nodes comprises: one or more processors having cache memories; a memory that is allocated a specific part of an address space shared by the plurality of nodes and stores data; a tag memory for storing tag data, the tag data indicating Valid or Invalid for each item of all the data stored in the memory is Valid or Invalid for each of all of the data stored in the memory; judging means that, in response to a data access request issued from any one of the one or more processors, judges whether or not the access request is contained in a specific part of the address space; and control means that, according to at least one of the judgment at the judging means and the tag data stored in the tag memory, performs a control process of the data for which the access request has been made.

According to a third aspect of the present invention, there is provided a control method in a multiprocessor system comprising: a plurality of nodes; and a bus for connecting the plurality of nodes to each other, wherein each of the plurality of nodes comprises: one or more processors having cache memories; a memory that is allocated a specific part of an address space shared by the plurality of nodes and stores data; a tag memory for storing tag data, the tag data indicating Modified to or not Modified to or free from any one of the processors contained in the plurality of nodes except for the nodes having the tag memory for each item of all the data stored in the memories contained in the plurality of nodes; the control method comprising the steps of: a) sensing a data access request issued from any one of the one or more processors; b) responding to the sensing of the access request and judging whether or not the access request is included in the address space allocated to a memory contained in the node which includes the processor that has made the access request; c) responding to the sensing of the access request and referring to the tag data stored in the tag memory; and d) executing a control process of the data for which the access request has been made, according to at least one of the judgment at the step b) and the tag data referred to at the step c).

According to a fourth aspect of the present invention, there is provided a control method in a multiprocessor system comprising: a plurality of nodes; and a bus for connecting the plurality of nodes to each other, wherein each of the plurality of nodes comprises: one or more processors having cache memories; a memory that is allocated a specific part of an address space shared by the plurality of nodes and stores data; a tag memory for storing tag data, the tag data indicating Valid or Invalid for each of all the data stored in the memory; the control method comprising the steps of: a) sensing a data access request issued from any one of the one or more processors; b) responding to the sensing of the access request and judging whether or not the access request is included in the address space allocated to a memory contained in the node which includes the processor that has made the access request; c) responding to the sensing of the access request and referring to the tag data stored in the tag memory; and d) executing a control process of the data for which the access request has been made, according to at least one of the judgment at the step b) and the tag data referred to at the step c).

With the above configuration, the tag memory holds tag information of all the main memory blocks (here, a main memory block means a portion of the main memory the size of which is equal to the cache block size), and indicates whether a valid data is stored in the main memory block or a modified data is kept in the cache memory of a processor. The bus interface controller refers to the tag information and makes a reply to cache coherency control. When the tag information indicates "Modified", it stops. The bus interface controller receives an access request from a processor, causes the built-in address comparator to sense the address range of the main memories distributed, and outputs the addresses to the internal bus or the system bus. Furthermore, it always monitors the system bus and changes the tag information when a "Modify" state (only the present cache has the valid data and the main memory data is invalid) has occurred in any one of the processors connected to the other internal bus, or when writeback to the main memory has occurred in the "Modify" state. The processor side obtains the tag information for the reference address from the tag memory, judges whether or not the response data obtained from the main memory is valid, and returns a cache coherency signal to the requesting processor.

This makes it possible to provide a high-speed memory subsystem using low-priced hardware.

Furthermore, because the individual tag memories do not store as much tag information (memory tag) as the total storage capacity of all the memories in the entire system, but store only the tag information corresponding to the memory installed in the main memory connected to the same bus interface controller, it is not necessary to prepare a tag memory with a large storage capacity according to an increase in the memory capacity of the system. In this case, when in the cache in any processor in the system, the rewriting of the data in the related main memory has been effected, that is, when a read with invalidate request or an invalidate request has been issued to the bus, the bus interface controller snoops and invalidates the tag information corresponding to the target data. When the data in the cache has been written back into the main memory, that is, when a write request has been issued, the bus interface controller makes the memory tag valid. If the tag information for the target data is valid when the bus interface controller has received an access request from the bus, it will complete the process by accessing the related main memory and issue no access request to the bus.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a block diagram of a multiprocessor system using a UMA method;

FIG. 2 is a block diagram of a multiprocessor system using a NUMA method;

FIG. 6 shows an address map of the main memory for a tag memory used in the multiprocessor system of FIG. 5;

FIG. 7 is a block diagram of the bus bridge in the multiprocessor system of FIG. 5;

FIG. 10 is a flowchart for the processing in a case where an invalidate request is issued in the multiprocessor system of FIG. 5;

FIG. 11 is a flowchart for the processing in a case where a write request is issued in the multiprocessor system of FIG. 5;

FIG. 13 shows an address map of each main memory in the multiprocessor system of FIG. 12;

FIG. 14 shows an address map of the main memory for a tag memory of FIG. 12;

FIG. 16 is a diagram to help explain the transition of the data stored in the cache of FIG. 12 between three states, Modified, Shared, and Invalid;

FIG. 17 is a diagram to help explain the transition of state of the memory tag stored in the tag memory of FIG. 12;

FIG. 18 is a flowchart for the processing in a case where a read request is issued in the multiprocessor system of FIG. 12;

FIG. 19 is a flowchart for the processing in a case where a read with invalidate request is issued in the multiprocessor system of FIG. 12;

FIG. 21 is a flowchart for the processing in a case where a write request is issued in the multiprocessor system of FIG. 12.

DETAILED DESCRIPTION OF THE PREFERRED EMBODIMENTS

Hereinafter, referring to the accompanying drawings, a first and second embodiments of the present invention will be explained.

Figure 5:
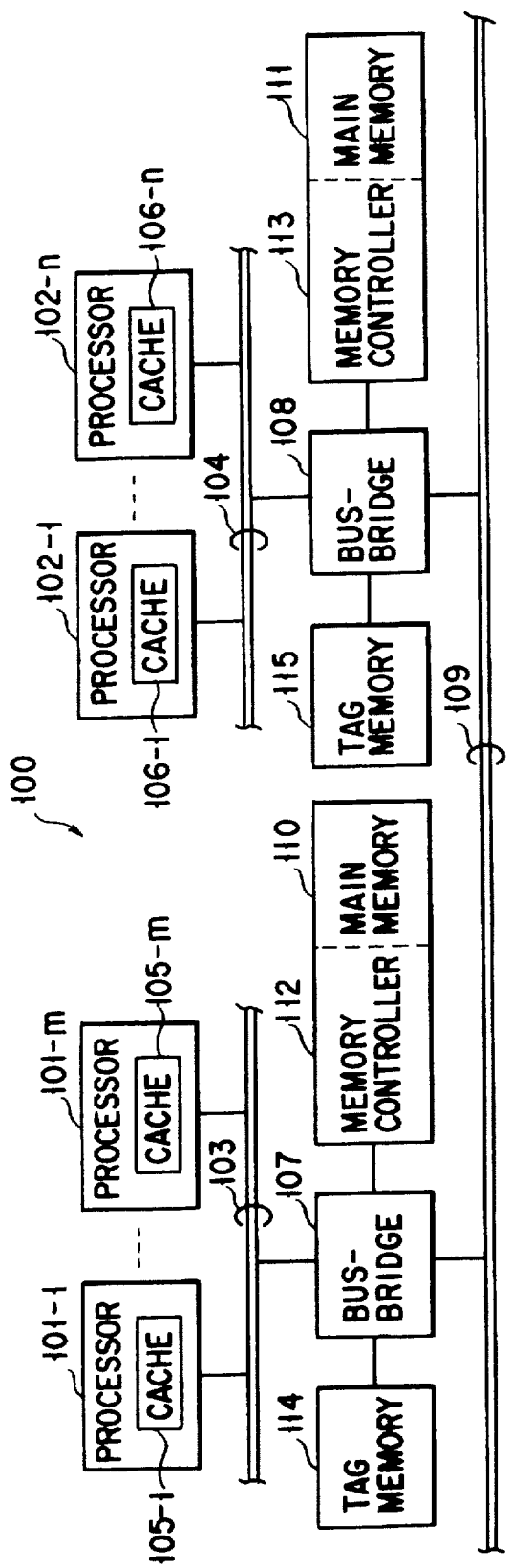
FIG. 5 is a block diagram of a multiprocessor system according to a first embodiment of the present invention.

FIG. 5 shows the configuration of a multiprocessor system 100 according to a first embodiment of the present invention. The multiprocessor system of FIG. 5 employs the NUMA scheme. As shown in FIG. 5, the multiprocessor system 100 of the first embodiment is provided with m+n (m>1, n>1) processors 101-1 to 101-m and 102-1 to 102-n. The processors 101-1 to 101-m are connected to each other via a processor bus 103. The processors 102-1 to 102-n are connected to each other via a processor bus 104.

Figures 3, 4:
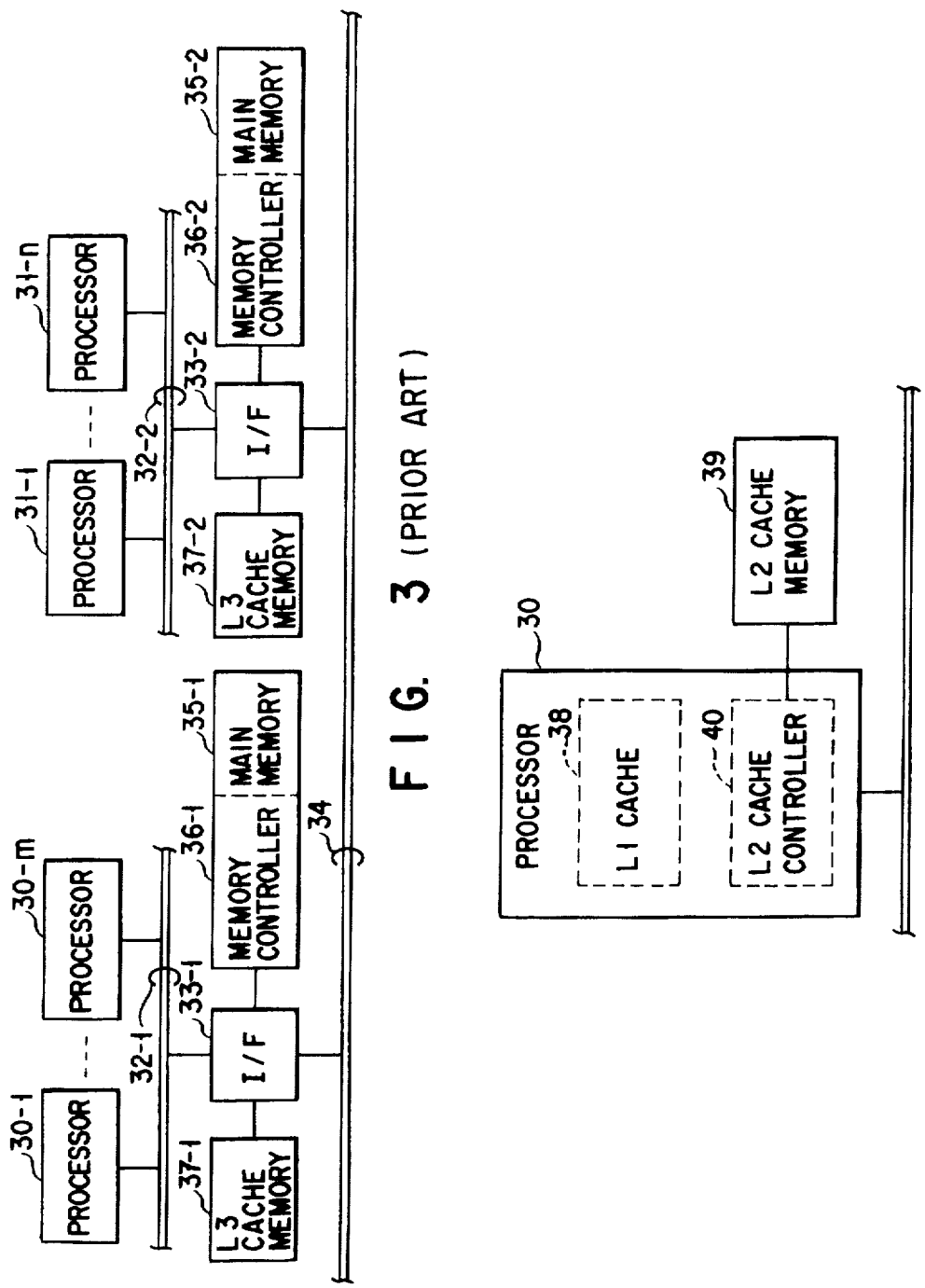
FIG. 3 is a block diagram of a multiprocessor system using a multi-level cache scheme.
FIG. 4 is a block diagram of a multi-level cache structure of each processor in the multiprocessor system shown in FIGS. 1 to 3.

The individual processors 101-1 to 101-m and 102-1 to 102-n contain caches 105-1 to 105-m and 106-1 to 106-n, respectively (which correspond to the L1 and L2 cache memories in FIG. 4). In the first embodiment, the cache memory block size is determined to be 64 bytes.

The processor buses 103 and 104 are connected to a system bus 109 via bus bridges 107 and 108, respectively.

The bus bridges 107, 108 have a bridge function between the processor buses 103, 104 and the system bus 109 (the function of transferring requests from both buses), the function of interfacing with the memory controllers 112, 113 contained in main memories 110, 111, and the function of interfacing with and controlling tag memories 114, 115.

The main memories 110, 111 store programs and data. In the first embodiment, the total memory capacity of the main memory 110 and main memory 111 is 64K bytes. The memory controllers 112, 113 provide memory access control (read control and write control) inside the main memories 110, 111, respectively.

The tag memories 114, 115 hold the one bit tag information for all the main memory blocks within the main memories 110, 111.

Hereinafter, for a bus bridge, processors directly connected to the bus bridge via a processor bus are called local processors, and other processors are called remote processors.

FIG. 6 shows the correspondence between the memory tag addresses in the tag memories 114, 115 used in the first embodiment and the physical addresses (the addresses allocated to the main memory 110 and main memory 111) in the multiprocessor system 100. Each memory tag address in the tag memories 114, 115 stores a 1-bit memory tag. When the memory tag is "0", this indicates that there is a modified block in one of the remote processors. When the memory tag is "1", this means that there is no modified block in any of the remote processors.

FIG. 7 shows the circuit configuration of the bus bridges 107, 108 of FIG. 5. Each of the bus bridges 107, 108 has the same circuit configuration.

A processor bus input/output controller 121 interfaces with the processor bus 103 or 104. A system bus input/output controller 122 interfaces with the system bus 109. A processor bus address comparator 123 checks whether or not the request address received via the processor bus 103, 104 corresponds to the local memory address. A main memory control input/output circuit 124 interfaces with the memory controllers 112, 113. A system bus address comparator 123 checks whether or not the request address received via the system bus 109 corresponds to the local memory address. A memory tag state controller 126 generates a state signal for cache coherency based on the memory tag state. A tag memory controller 127 interfaces with the tag memory. A memory tag state changing circuit 128 changes the memory tag state by snooping transactions on the system bus 109.

Explanation of cache control will be given.

As explained above, each of the processors 101-1 to 101-m, 102-1 to 102-n contains a cache. To guarantee the cache coherency, the processors 101.1 to 101-m realize snooping function about the processor bus 103 and the processors 102-1 to 102-n realize snooping function about the processor bus 104. An example of a processor that supports the copy-back (or write-back) cache MESI protocol will be explained.

In MESI, literally a cache block has one of the following four states:

M (Modified): The cache block is valid. The main memory data is invalid (may be different from the cache block data). Only the present cache has the modified data.

E (Exclusive): The cache block is valid. The main memory data is valid (is equal to the cache block data). Only the present cache has the valid data.

S (Shared): The cache block is valid. The main memory data is valid (is equal to the cache block data). Some other caches may have the data.

I (Invalid): The cache block is invalid.

The MESI protocol cache performs cache coherency control by snooping on the processor bus, making the state transition between the four states, and sending an appropriate response on the processor bus.

In this example, since each processor contains an L2 cache controller, each of the processors 101-1 to 101-m, 102-1 to 102-n carries out the cache control. With the system configuration of FIG. 5, there are two processor buses, which are separated from each other. This makes it impossible for a processor to snoop on the other processor bus.

To maintain the cache coherency among all the processors 101-1 to 101-m and 102-1 to 102-n, the following functions are added to the tag memories 114, 115 and the bus bridges 107, 108.

First, the tag memories 114, 115 will be described.

FIG. 6 shows a case where the main memory capacity is 64KB (the total capacity of the main memory 110 and the main memory 111) and the cache block size is 64 B. A 1-bit memory tag is assigned to a cache block. Namely, because each of the tag memories 114, 115 has a capacity of the main memory capacity/the cache block size, it requires a capacity of 1K bits in the example of FIG. 6. The tag memory stores information as to whether or not a remote processor contains a modified block.

Next, the function of the bus bridges 107, 108 will be described.

As described above, the bus bridges 107, 108 have a bridge function between the processor buses 103, 104 and the system bus 109 and the function of comparing request addresses. Hereinafter, it is assumed that the processor 101-1 have issued a data write request or a data read request.

The request from the processor 101-1 is input to the processor bus input/output controller 121 in the bus bridge 107 via the processor bus 103. Then, the request address is input to the processor bus address comparator 123. In the case that the request address corresponds to the main memory 110 (local memory address), the request is sent to the input/output circuit 124, then is sent to the memory controller 112. In the case that the request address corresponds to the main memory 111 (remote memory address), the request is sent to the system bus 109 through the system bus input/output controller 112. The request output onto the system bus 109 is input to the system bus input/output controller 122 of the bus bridge 108, which inputs it to the system bus address comparator 125. The bus bridge 108 compares it with the address range of the main memory 111. Only when the request address is in the address range, the main memory control input/output circuit 124 sends it to the memory controller 113.

With the present invention, the bus bridges 107, 108 are further provided with the following function.

The function of the memory tag state changing circuit 128 will be explained. The bus bridges 107, 108 always snoop on the system bus 109. When the following conditions are met, they will send a memory tag information change request to the tag memory controller 127:

(1) Setting the memory tag to "0" (Remote Modified): For the bus bridge having the corresponding memory, one of the processors connected to a bus bridge other than the present bus bridge has modified the data and retains it within its cache.

For a bus bridge not having the corresponding memory, one of the processors connected to the present bus bridge has modified the data and retains it within its cache. (2) Setting the memory tag to "1" (Remote Clean): For the bus bridge having the corresponding memory, one of the processors connected to a bus bridge other than the present bus bridge has written back the modified data to the main memory.

For a bus bridge not having the corresponding memory, one of the processors which is connected to the present bus bridge has written back the modified data to the main memory.

Specifically, memory tags stored in the tag memories 114, 115, can be rewritten if only a request with the corresponding request address from the system bus 109 occurs. In the case of such a request as write-back or modify, the request is sent through a direct path from the processor bus input/output controller 121 to the system bus input/output controller 122.

The memory tag will be explained further.

A case where the processor 101-1 executes a store instruction for the main memory 110 will be considered. At that time, the values of the memory tags corresponding to the data in the tag memories 114, 115 become Remote Clean, regardless of the previous values of the memory tags before that time. That the value of the memory tag in the tag memory 114 is Remote Clean means that there is no data retained in the Modified state in any cache of the processors connected to a bus bridge other than the bus bridge 107 (in this case, the bus bridge 108). On the other hand, that the value of the memory tag in the tag memory 115 is Remote Clean means that there is no data retained in the Modified state in any cache of the processors connected to the present bus bridge (in this case, the bus bridge 108).

Next, a case where the processor 101-1 executes a store instruction for the main memory 111 will be considered. At that time, the values of the memory tags corresponding to the data items in the tag memories 114, 115 become Remote Modified, regardless of the previous values of the memory tags before that time. That the value of the memory tag in the tag memory 114 is Remote Modified means that there is the data retained in the Modified state in one of the caches of the processors connected to the present bus bridge (in this case, the bus bridge 107). On the other hand, that the value of the memory tag in the tag memory 115 is Remote Modified means that there is the data retained in the Modified state in one of the caches of the processors connected to a bus bridge other than the bus bridge 108 (in this case, the bus bridge 107).

In the first embodiment, to simplify the explanation, only two bus bridges 107, 108 are connected to the system bus 109, so that the values of the memory tags corresponding to the data in the tag memories 114, 115 change in the same manner. In a case where another bus bridge or I/O device is connected to the system bus 109, they may be different. For example, although not shown, in a case where a third bus bridge is connected to the system bus 109, when the processor 101-1 executes a store instruction for the main memory 111, the values of the corresponding memory tags in the tag memories 114, 115 become both Remote Modified, but the value of the corresponding memory tag in the tag memory for the third bus bridge becomes Remote Clean. This means that there is no data retained in the Modified state in any cache of the processors connected to the third bus bridge.

The processor bus side carries out the following control.

When the processor 101-1 issues a read request to the memory 110, the processor bus input/output controller 121 informs the memory tag controller 127 of the request address and the value of the corresponding memory tag is read from the tag memory 114. The tag information is sent to the memory tag state controller 126. Then the memory tag state controller 126 performs the following control based on the tag information:

(1) When memory tag=Remote Clean ("1")

Because there is no modified block retained in any caches of the processors 102-1 to 102-n connected to the other processor bus 104, it is determined that the valid data is in the main memory 110 or in one of the caches of the processors 101-1 to 101-m connected to the present bus 103. Therefore the read request can be processed within the processor bus 103, the processors 101-1 to 101-m, and the memory 110. So the read request is not issued to the system bus 109. The bridge responds a "Shared" state which will be explained later.

(2) When memory tag =Remote Modified ("0")

There is a modified block in one of the caches of the processors 102-1 to 102-n. The read request is sent to the bus bridge 108 via the system bus 109. Then the tag memory controller 127 of the bridge 108 reads the corresponding memory tag from the tag memory 115. In this case, the value of the memory tag is Remote Modified which indicates there is the data in Modified state in one of the caches 106-1 to 106-n. Therefore the read request is issued to the processor bus 104. The processor with the modified data in its cache responds to the request by sending a retry. Then the processor issues a write request so that the modified data is written back to the main memory 110. When the write request passes through the bridge 108, the corresponding memory tag in the tag memory 115 becomes Remote Clean. When the write request passes through the bridge 107, the corresponding memory tag in the tag memory 114 becomes Remote Clean too.

Then the processor 101-1 issues a read request again because the first read request resulted in a retry. The second read request is executed in the way where the corresponding memory tag is Remote Clean.

Some supplementary explanation of a response of "Shared" state from the bus bridge will be given. The cache protocol supports four states of MESI. The present invention, however, uses only three states of MSI without "E" (Exclusive). When the main memory data is read by a processor, the cache block state becomes "Shared" by a "Shared" state response from the bridge. This avoids a cache state transition from "Exclusive" to "Modified" which can not be observed outside the processor. Whenever the data in a cache block is modified by executing a store instruction to the data, a bus coherency transaction to the processor bus will take place. The occurrence of the transaction enables control of memory tags.

In general, the cache coherency control needs the transaction delivered to all the processors. The scheme of the present invention, however, makes such delivery unnecessary in some case. Namely in the case of a local address request with memory tag Remote Clean, the transaction is completed without using the system bus.

Referring to flowcharts, the operation of the first embodiment will be explained.

Explained here will be the operation in the cases where the processor 101-1 has issued (1) a read request, (2) a read with invalidate request, (3) an invalidate request, and (4) a write request.

(1) Read request

Figure 8:
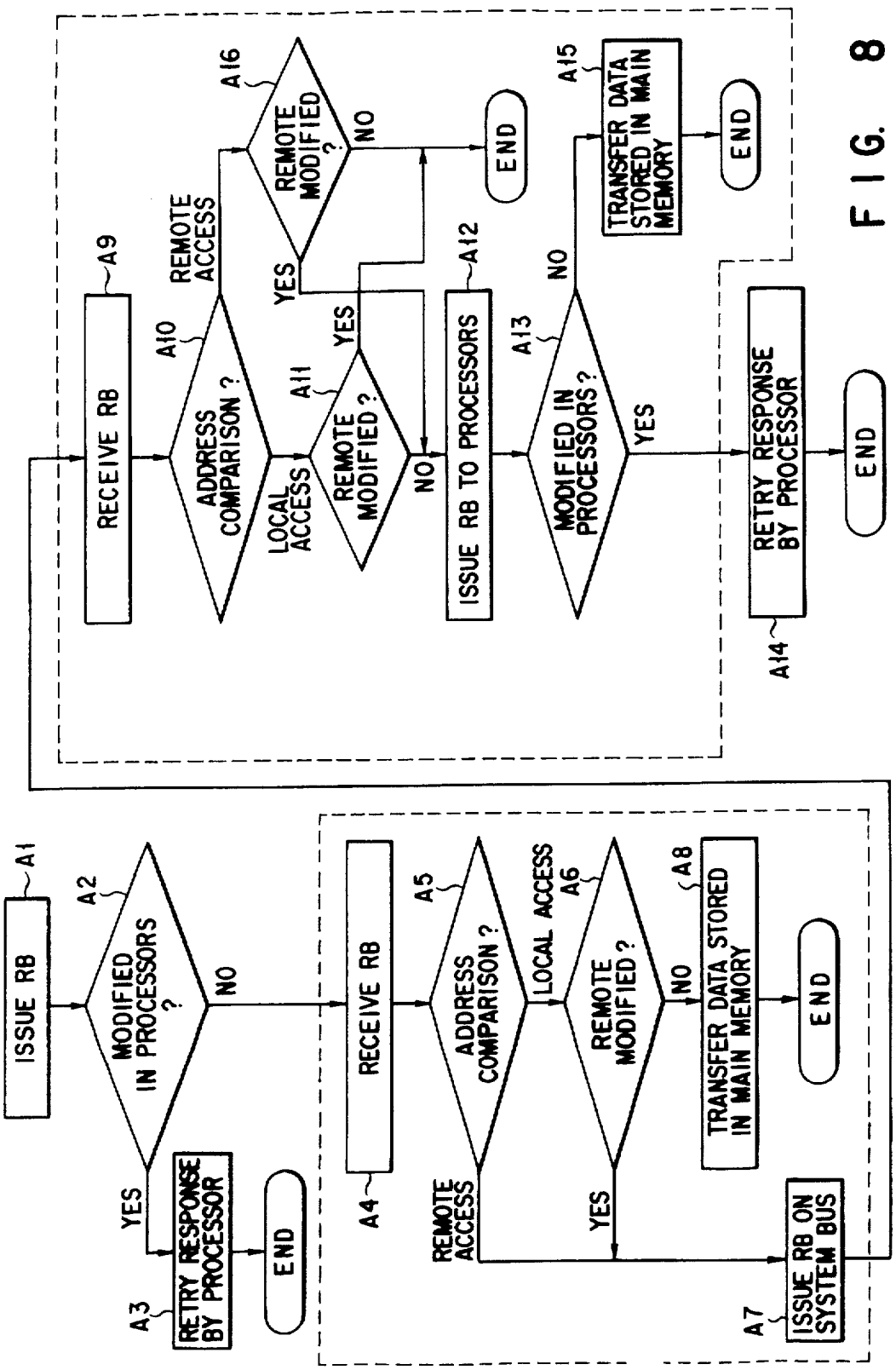
FIG. 8 is a flowchart for the processing in a case where a read request is issued in the multiprocessor system of FIG. 5.

The flow of processing in a case where the processor 101-1 has issued a read request is shown in the flowchart in FIG. 8. The processes enclosed by broken lines are the processes executed by the bus bridge 107 or 108.

First, processor 101-1 issues a read request to the processor bus 103 (step A1).

In response to the issued request, the individual processors 101-2 to 101-m connected to the processor bus 103 judge whether or not they have the requested data in the caches 105-2 to 105-m with the Modified state (step A2). If any one of the processors has the requested data with the Modified state, the processor makes a retry response and interrupts the read request (step A3). Then, the processor having the requested data writes back the requested data into the main memory using a write request (this is a normal operation of a snoop-type processor). Thereafter, the processor 101-1 reissues a read request.

In the bus bridge 107, the processor bus input/output controller 121 takes the read request issued to the processor bus 103 (step A4). As in the aforementioned steps A2 and A3, when one of the processors 101-2 to 101-m makes a retry response to the read request, the read request is discarded by the bus bridge 107 at that time.

Otherwise the bus bridge 107 causes the processor bus address comparator 123 to judge whether the received read request address is in the range of the main memory 110 (local access) or in the range of the main memory 111 in the configuration of FIG. 5 (remote access) (step A5).

The tag memory controller 127 reads the value of the corresponding memory tag and judges whether or not it is Remote Modified (step A6).

Because the process of judging the value of the memory tag is meaningful only in the case of local access, the reading of the tag memory may be started after the processor bus address comparator 123 has judged that the read request is for local access. In this case, the tag memory controller 127 receives the judgment result of the processor bus address comparator 123 and starts access to the tag memory 114. For higher-speed operation, however, the tag memory controller 127 may read the data from the tag memory when the read request acceptance is noticed by the processor bus input/output controller 121 and start judgment without waiting for the judgment result of the processor bus address comparator 123.

If the result of the processor bus address comparator 123 indicates remote access, or the memory tag indicates Remote Modified, the system input/output controller 122 issues the read request obtained via the processor bus input/output controller 121 to the system bus 109 (step A7).

If the result of the processor bus address comparator 123 indicates local access and the memory tag indicates Remote Clean, the main memory control input/output circuit 124 informs the memory controller 112 of the read request. The memory controller 112 reads the relevant data from the main memory 110, and outputs it to the main memory control input/output circuit 124. The readout data is supplied to the processor 101-1 via the main memory control input/output circuit 124, the processor bus input/output controller 121, and the processor bus 103 (step A8).

For higher-speed operation, the main memory control input/output circuit 124 may start read control of the main memory 110 without waiting for the address comparison at the processor bus address comparator 123 and the memory tag judgment at the tag memory controller 127, as in the case of accessing the tag memory 114. In this case, the main memory control input/output circuit 124 accesses the main memory 110 and the processor bus input/output controller 121 may determine whether to output the data to the processor bus 103 according to the judgment result of the tag memory controller 127 and the result of the address comparison.

At step A7, the read request issued to the system bus 109 is taken by the system bus input/output controller 122 of the bus bridge 108 (step A9).

In the bus bridge 108, the system bus address comparator 125 judges whether the address of the received read request is in the range of the main memory 111 (local access) or in the other range (remote access) (step A10).

When the result of the address comparison at the system bus address comparator 125 indicates remote access, the tag memory control circuit 127 reads the memory tag and depending on whether the tag indicates Remote Modified (step A15), operates as follows.

When the memory tag indicates Remote Modified, the updated data exists in one of the caches 106-1 to 106-n of the processors 102-1 to 102-n, so that a read request is issued to the processor bus 104 via the processor bus input/output control circuit 121 (step A12). If a processor retains the data, the processor makes a retry response and interrupts the read request. Thereafter, the processor writes back the data into the main memory. Then, the processor 101-1 reissues a read request.

When the memory tag indicates Remote Clean, the updated data does not exist in any of the caches 106-1 to 106-n of the processors 102-1 to 102-n, so that the bus bridge 108 terminates the process without issuing a read request to the processor bus 104.

In the first embodiment, to simplify the explanation, only two bus bridges 107, 108 are connected to the system bus 109. Therefore, when it is judged to be remote access at step A10, it is certain that one of the processors 102-1 to 102-n holds the data with the Modified state in its cache. Namely, the memory tag never indicates Remote Clean. If another bus bridge or I/O device is connected to the system bus 109, however, the memory tag can indicate Remote Clean.

On the other hand, when the result of the address comparison at the system bus address comparator 125 has shown local access, the tag memory control circuit 127 reads the memory tag and depending on whether the tag indicates remote Modified (step A10), operates as follows.

When the memory tag indicates Remote Modified, the content of the main memory 111 is not valid and the caches 106-1 to 106-n of the processors 102-1 to 102-n have no updated data, so that the bus bridge 108 terminates the read request process. In the first embodiment, to simplify the explanation, only two bus bridges 107, 108 are connected to the system bus 109. Therefore, when the processor 101-1 has issued a read request, the memory tag never indicates Remote Modified. However if another bus bridge or I/O device is connected to the system bus 109, the memory tag may indicate Remote Modified.

When the memory tag indicates Remote Clean, the bus bridge 108 issues a read request to the processor bus 104 (step A12). The read request issued to the processor bus 104 is snooped about by the processors 102-1 to 102-n. The processor 102-1 to 102-n check to see if their caches 106-1 to 106-n retains the requested data with Modified state. If such a processor exists, the processor interrupts the read request by making a retry response (step A13, YES), and writes back the modified data into the main memory (step A14). Thereafter the processor 101-1 reissues the read request.

When there is no retry response, the main memory control input/output circuit 124 has issued a read request to the memory controller 113. The memory controller 113 executes read access to the main memory 111, reads the relevant data, and outputs it to the main memory control input/output circuit 124. The read-out data is transferred to the processor 101-1 via the main memory control input/output circuit 124 and system bus input/output controller 122 of the bus bridge 108, the system bus 109, the system bus input/output controller 122 and processor bus input/output controller 121 of the bus bridge 107, and the processor bus 103 (step A15).

For higher-speed operation, the main memory control input/output circuit 124 may start read control of the main memory 111 without waiting for the address comparison at the system bus address comparator 125 and the memory tag judgment at the tag memory controller 127, as in the case of accessing the tag memory 115.

Furthermore, the main memory control input/output circuit 124 may access the main memory 111 according to the read request, regardless of the state of the memory tag, and the system bus input/output controller 122 may determine whether to output the data to the system bus 109 according to the judgment result of the tag memory controller 127.

(2) Read with invalidate request

Figure 9:
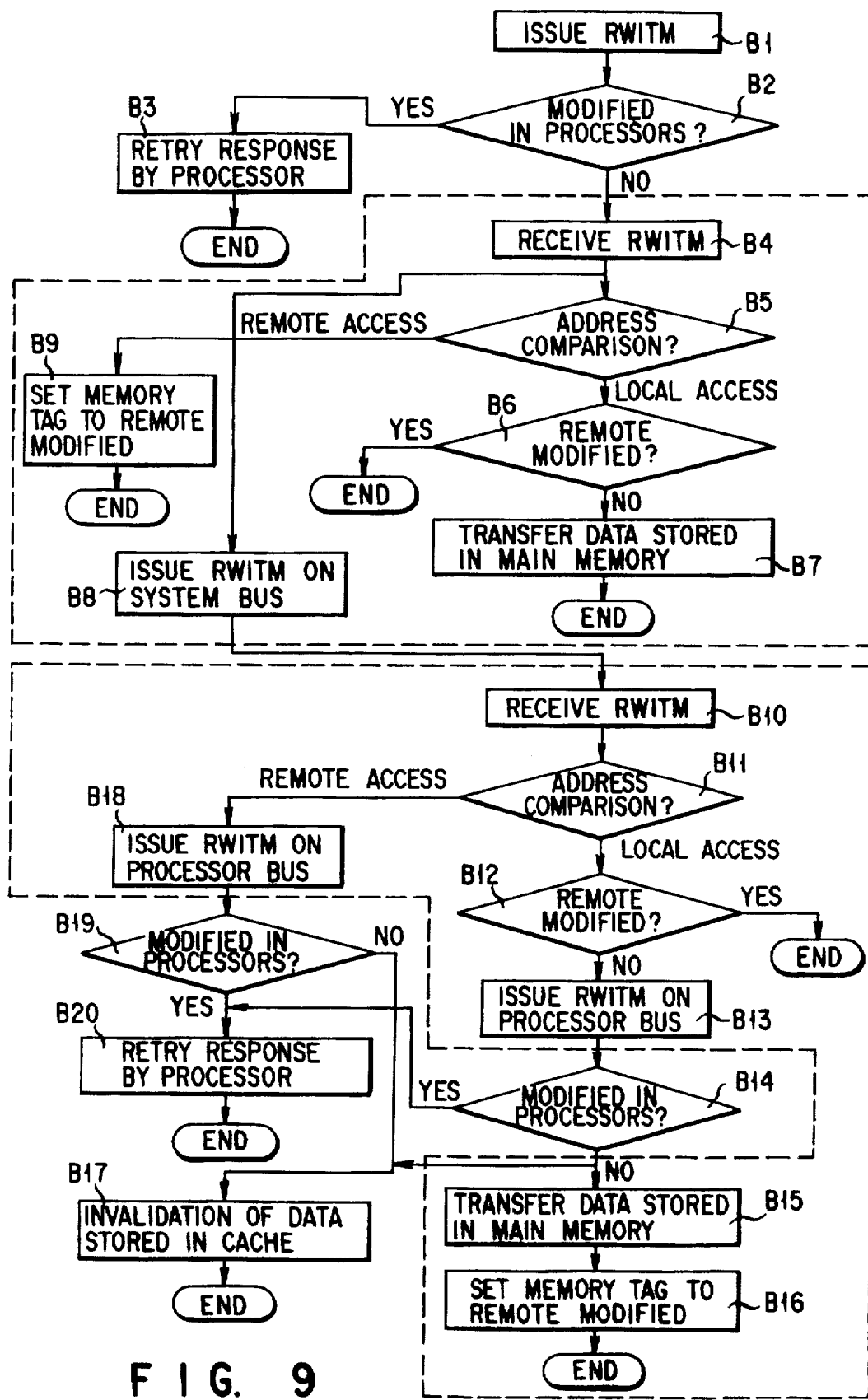
FIG. 9 is a flowchart for the processing in a case where a read with invalidate request is issued in the multiprocessor system of FIG. 5.

The flow of processing in a case where the processor 101-1 has issued a read request with invalidation is shown in the flowchart in the FIG. 9. As in FIG. 8, the processes enclosed by broken lines are executed by the bus bridge 107 or 108.

Since the process of a read request with invalidation is generally the same as that of the above-described read request, explanation will be centered on the difference between them.

In the process of the aforementioned read request, the read request is not delivered through the system bus 109 if the requested address is for the main memory 110 (local memory) and the tag memory indicates Remote Clean.

In contrast, a read with invalidate request must be delivered to all the processors so that all the processors other than the processor 101-1 discard the relevant data in its caches. The tag memory has no information about whether or not a cache has the relevant data with Shared state.

Therefore, when receiving the read with invalidate request at the processor bus input/output controller 121 (step B4), the bus bridge 107 unconditionally issues a read request with invalidation to the system bus 109 via the system bus input/output controller 122 (step B8).

In addition, the corresponding memory tag is set Remote Modified if the address comparison indicates that the target memory is remote, that is, the main memory 111 (step B9).

When receiving the read request with invalidation at the system bus input/output controller 122 (step B10), the requested address is checked to see whether or not the requested address is for the main memory 111.

First, the case where the requested address is for the main memory 111 (step B11 LOCAL ACCESS) is explained. In this case, the corresponding memory tag is checked. If the memory tag indicates Remote Modified (step B12, YES), it means that none of the processors 102-1 to 102-n have the valid data in their caches 106-1 to 106-n. Therefore, the request needs not to be issued to the processor bus 104. If the memory tag indicates Remote Clean, the read with invalidation request is issued on the processor bus 104, since some processors may have the relevant data in their caches. If a processor retains the data with Modified state, it makes a retry response and writes back the data into the main memory 111 (step B20). Otherwise the processors having the data with Shared state invalidate it in its cache (step B17) and the input/output circuit 124 of the bus bridge 108 sends a read request to the memory controller 113. The read-out data is transferred to the processor 101-1 through the system bus 109 (step B15) and the corresponding memory tag is set to Remote Modified.

Next, the case where the requested address is not for the main memory 111 (step B11, REMOTE ACCESS) is considered. In this case, the read with invalidation request is issued to the processor bus 104 without any conditions (step B18). If a processor retains the data with Modified state, it makes a retry response (step B20). Otherwise the processors having the data with shared state invalidate it in its cache (step B17).

(3) Invalidate request

The flow of processing in a case where the processor 101-1 has issued an invalidate request is shown in the flowchart in the FIG. 10. As in FIG. 8, the processes enclosed by broken lines are executed by the bus bridge 107 or 108.

An invalidate request is issued when the data exists in the cache 105-1 with Shared state. It means that the corresponding memory tags of the tag memory 114 and 115 are both Remote Clean.

When the request is received by the processor bus input/output controller 121 of the bus bridge 107, the requested address is checked to see whether or not the request is for the main memory 110. If the address corresponds to the main memory 110 (step C9, LOCAL ACCESS), the tag memory needs not to be changed. Otherwise, the corresponding memory tag of the tag memory 114 is set to Remote Modified.

At the same time with the aforementioned operation, the request is issued to the system bus 109 unconditionally in order to invalidate the relevant data within the caches 106-1 to 106-n. When the request is received by the system bus input/output controller 122 of the bus bridge 122, the request is issued to the processor bus 104 which invalidates the relevant data within the caches 106-1 to 106-n.

The invalidate request issued to the processor bus 104 is snooped about by the processors 102-1 to 102-n. If their caches 106-1 to 106-n have the relevant data, the processors 102-1 to 102-n change the state into Invalid (step C8).

Furthermore the requested address is checked by the system bus address comparator 125 to see whether or not the address is for the main memory 111. If it is the case (step C5, LOCAL ACCESS), then the corresponding memory tag of the tag memory 115 is set Remote Modified.

(4) Write request

The flow of processing in a case where the processor 101-1 has issued a write request is shown in the flowchart in the FIG. 11. As in FIG. 8, the processes enclosed by broken lines are executed by the bus bridge 107 or 108.

A write request is issued when the data is retained in the cache 105-1 with Modified state.

The bus bridge 107 causes the processor bus input/output controller 121 to take in the write request issued to the processor bus 103 (step D2). Within the bus bridge 107, the processor bus address comparator 123 judges whether the received write request is for the main memory 110 or for the main memory 111 (step D3).

If the address comparison result of the processor bus address comparator 123 has shown remote access (step D3, REMOTE ACCESS), the system bus input/output controller 122 issues the write request to the system bus 109 (step D6), furthermore, the tag memory controller 127 changes the memory tag corresponding to the target data into Remote Clean (step DS).

If the address comparison result of the processor bus address comparator 123 has shown local access (step D3, LOCAL ACCESS), the main memory control input/output circuit 124 sends the memory controller 112 the write request. The memory controller 112 executes write operation to the main memory 110, and writes the relevant data (step D4). The tag memory controller 127 sets the memory tag corresponding to the target data into Remote Clean (step DS). The change of memory tag at the tag memory controller 127 and a write request from the main memory control input/output circuit 124 to the main memory 111 can be executed in parallel.

The write request issued to the system bus 109 at step D6 is taken in by the system bus input/output controller 122 of the bus bridge 108 (step D7). Within the bus bridge 108, the system bus address comparator 125 judges whether the received write request is for the main memory 111 or not (step D8).

If the address comparison result of the system bus address comparator 125 is remote access (step D8, REMOTE ACCESS), the process is finished. If the address comparison result of the system bus address comparator 125 is local access, the main memory control input/output circuit 124 sends the memory controller 112 the write request. The memory controller 112 executes write operation to the main memory 111 (step D9). The tag memory controller 127 sets the memory tag corresponding to the target data into Remote Clean (step D10). The change of memory tag at the tag memory controller 127 and a write request from the main memory control input/output circuit 124 to the main memory 210 can be executed in parallel.

The advantages of the tag memory are summarized as follows:

The latency of a read request is smaller and it does not consume the system bus band width if the target is the local memory and the corresponding memory tag indicates Remote Clean.

If it is not the case, the read request is transferred through the system bus and received by each of the bus bridges. In this case, a bridge whose corresponding memory tag indicates Remote Clean needs not issue the request to its corresponding processor bus, which is another advantage.

For a read with invalidation request, the latency is smaller too if the target is the local memory and the corresponding memory tag indicates Remote Clean.

Hereinafter, a second embodiment of the present invention will be explained with reference to the accompanying drawings.

With the first embodiment, each of the tag memories 114 and 115 keeps the tag information for both the main memories 110 and 111. However it is possible to reduce the tag memory size so that a tag memory has the aforementioned tag information for its local memory. That is, the tag memory 114 keeps track of only the main memory 110 and the tag memory 115 keeps track of only the main memory 111. With this embodiment, the flowcharts of FIG. 8 to FIG. 11 should be changed slightly.

In FIG. 8, the conditional branch of step A16 should always turn to Remote Modified YES, because the tag memory 115 has no information for the main memory 110. Thus, it is always necessary to issue the read request to the processor bus 104. It would lead to slight performance degradation, but the system operates properly.

In FIG. 9, step B9 should be omitted because the step B9 changes the tag memory 114 for the main memory 111.

In FIG. 10, no steps should be changed.

In FIG. 11, the original flowchart indicates that if the address comparison of step D3 results remote access, step D5 should be done. However, this step should be omitted because this step changes the tag memory 114 for the main memory 111.

The second embodiment explained below shows another way to reduce the tag memory capacity with little performance degradation in which the meaning of the memory tag is slightly different from that of the first embodiment.

Figure 12:
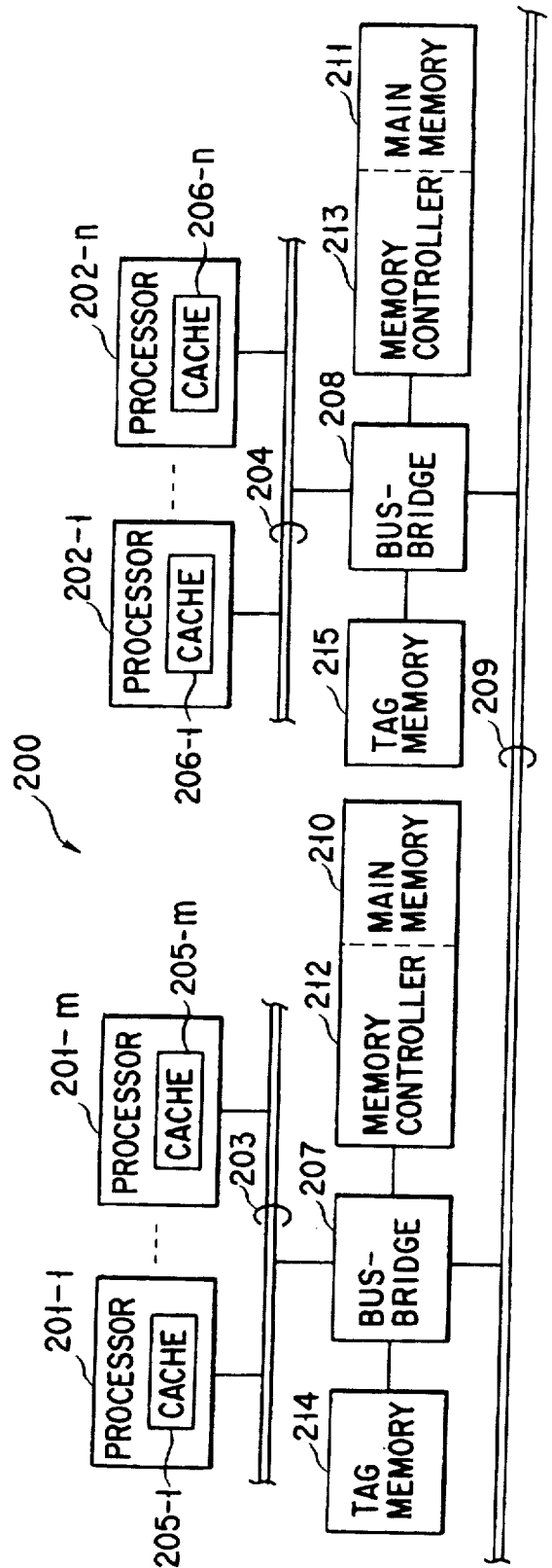
FIG. 12 is a block diagram of a multiprocessor system according to a second embodiment of the present invention.

The configuration of a multiprocessor system 200 according to the second embodiment is shown in FIG. 12. The multiprocessor system of FIG. 12 employs the NUMA scheme. As shown in FIG. 12, the multiprocessor system 200 of the second embodiment is provided with m+n (m>1, n>1) processors 201-1 to 201-m and 202-1 to 202-n. The processors 201-1 to 201-m are connected to each other via a processor bus 203. The processors 202-1 to 202-n are connected to each other via a processor bus 204.

The individual processors 201-1 to 201-m and 202-1 to 202-n contain caches 205-1 to 205-m and 206-1 to 206-n, respectively (which correspond to the L1 and L2 cache memories in FIG. 4). In the second embodiment, the cache memory block size is determined to be 64 bytes.

The processor buses 203 and 204 are connected to a system bus 209 via bus bridges 207 and 208, respectively. The bus bridges 207, 208 have a bridge function between the processor buses 203, 204 and the system bus 209 (the function of transferring requests from both buses), the function of interfacing with the memory controllers 212, 213 contained in main memories 210, 211, and the function of interfacing with and controlling tag memories 214, 215.

The main memories 210, 211 store programs and data. In the second embodiment, the memory capacity of the main memories 210 and 211 is 64K bytes. The memory controllers 212, 213 provide memory access control (read control and write control) of the main memories 210, 211, respectively.

The tag memories 214, 215 store as much tag information (memory tag) as the storage capacity of the memories installed in the main memories 210 and 211 managed by the individual bus bridges 207, 208. Tag information has one bit per cache block. In the second embodiment, since one cache block contains 64 bytes and the capacity of each of the main memories 210, 211 is 64K bytes, the capacity of each of the tag memories 214, 215 is 1K bits.

FIG. 13 shows an address map of the multiprocessor system in the second embodiment, where the physical addresses from 0 to FFFF are allocated to the main memory 210, and the physical addresses from 10000 to 1FFFF are allocated to the main memory 211.

FIG. 14 shows the correspondence between the memory tag addresses in the tag memory 214 used in the second embodiment and the physical memory addresses of the main memory 210.

As shown in FIG. 14, a 1 bit memory tag is allocated to each 64 bytes (namely the cache block size) of the main memories 210, 211. In the second embodiment, memory tag "0" indicates that the data in the corresponding portion of the main memory is invalid, that is, the updated data is retained in one of the processors' caches of the system 200. Memory tag "1" indicates that the data in the corresponding portion of the main memory is valid. In this case, the data may be retained in some processors' caches with Share state.

Figure 15:
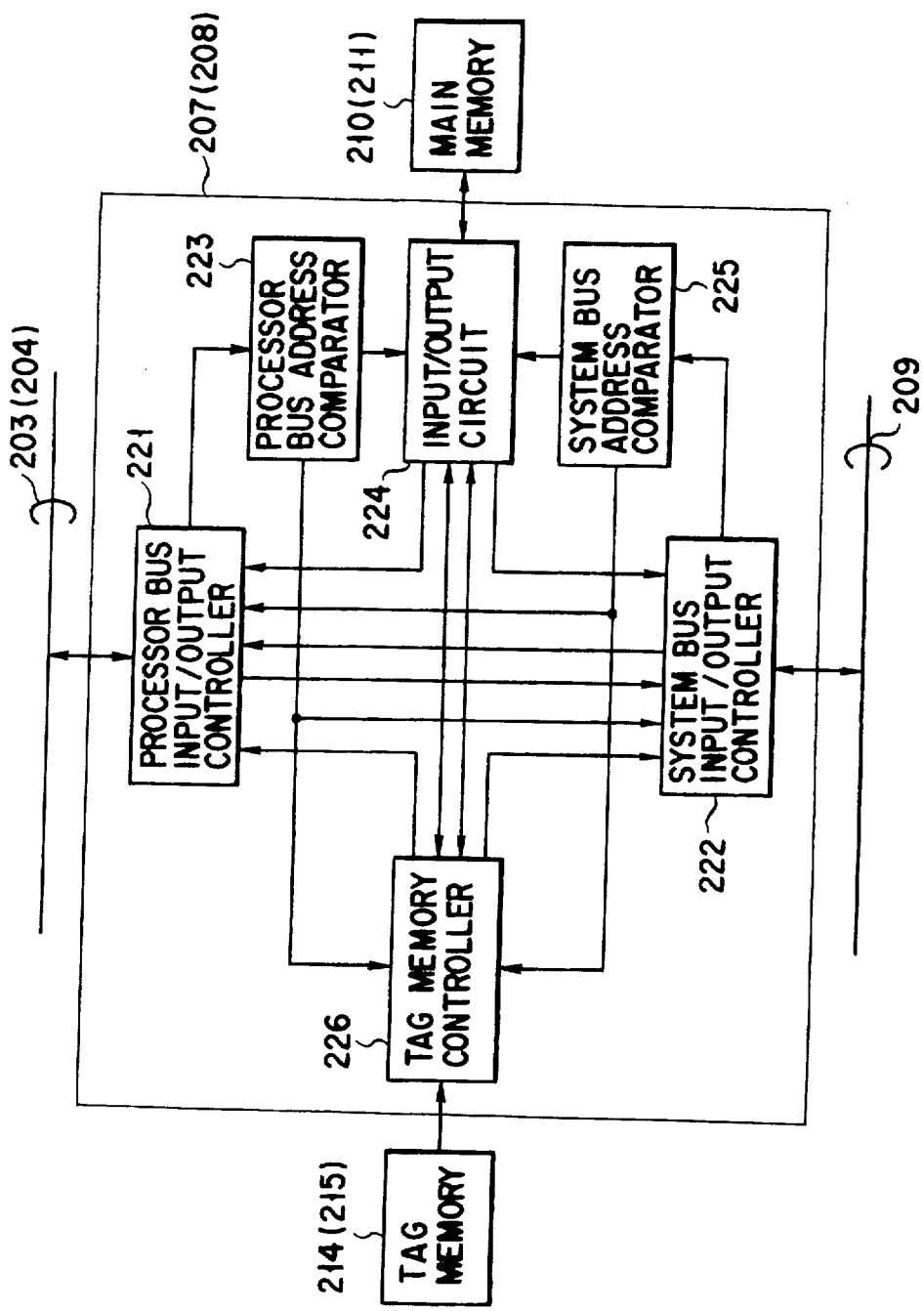
FIG. 15 is a block diagram of the bus bridge of FIG. 12.

FIG. 15 is a block diagram of the bus bridges 207, 208 shown in FIG. 12. Either bus bridge has the configuration of FIG. 15. As shown in FIG. 15, the bus bridge 207 (208) comprises a processor bus input/output controller 221, a system bus input/output controller 222, a processor bus address comparator 223, a main memory control input/output circuit 224, a system bus address comparator 225, and a tag memory input/output circuit 226.

The processor bus input/output controller 221 interfaces with the processor bus, inputs the transaction issued to the processor bus, and issues a transaction to the processor bus. The processor bus input/output controller 221 supplies to the processor bus address comparator 223 the address indicating the target data of the input transaction.

The system bus input/output controller 222 interfaces with the system bus 209, inputs the transaction issued to the system bus, and issues a transaction to the system bus. The system bus input/output controller 222 supplies to the system bus address comparator 225 the address indicating the target data of the transaction.

Comparing the address supplied from the processor bus input/output controller 221 with the physical address range of the relevant main memory, the processor bus address comparator 223 judges whether the transaction issued to the processor bus is an access request (local access) for the main memory corresponding to the relevant bus bridge or an access request (remote access) for the other main memory. In the second embodiment, as shown in FIG. 13, since the physical addresses are allocated to the main memory 210 (211), the processor bus address comparator 223 makes a judgment, referring to the most-significant bit in a 17-bit address. The bus bridge 207 compares the most-significant bit in the address with "0". The bus bridge 208 compares the most-significant bit with "1". As a result of the comparison, whey then are equal, the processor bus address comparator 223 judges that the address is a local address, and when they are not equal, it judges that the address is a remote address.

The main memory control input/output circuit 224 interfaces with the memory controller 212 (213).

It requires the memory controller 212 (213) to access the main memory 210 (211), when the processor bus address comparator 223 or the system bus address comparator indicates that the main memory 210 (211) is the target and the corresponding memory tag of the tag memory 214 (215) meets some condition. For faster execution, it is possible that the main memory control input/output circuit 224 issues a read or write request without waiting for the results described above.

Comparing the address supplied from the system bus input/output controller 222 with the physical address range of the relevant main memory, the system bus address comparator 225 judges whether the transaction issued to the system bus 209 is an access request (local access) for the main memory corresponding to the relevant bus bridge or an access request (remote access) for the other main memory. Like the aforementioned processor bus address comparator 223, the system bus address comparator 225 makes a judgment, referring to the most-significant bit in a 17-bit address. The bus bridge 207 compares the most-significant bit of the address with "0". The bus bridge 208 compares the most-significant bit with "1". As a result of the comparison, when they are equal, the processor bus address comparator 223 judges that the address is a local address, and when they are not equal, it judges that the address is a remote address.

The tag memory input/output controller 226 interfaces with the tag memories and sets a memory tag to "Valid" or "Invalid" according to the transaction on the processor bus input/output controller 221 and the system bus input/output controller 222. When being informed that the data in the main memory corresponding to the relevant bus bridge has been updated in the cache of a processor, the tag memory input/output circuit 226 sets the memory tag corresponding to the relevant cache block to Invalid "0". When the data stored in the cache is written back into the main memory corresponding to the relevant bus bridge, the memory tag corresponding to the relevant cache block is set to Valid "1".

In the multiprocessor system of the second embodiment, there are provided two nodes: one node consists of the processors 201-1 to 201-m, the processor bus 203, the bus bridge 207, the main memory 210, and the tag memory 214, and the other node consists of the processors 202-1 to 202-n, the processor bus 204, the bus bridge 208, the main memory 211, and the tag memory 215. However, the number of nodes is not necessarily limited to two.

Cache control in the second embodiment will be explained.

As described above, the individual processors 201-1 to 201-m, 202-1 to 202-n contain caches 205-1 to 205-m, 206-1 to 206-n, respectively. To guarantee the coherency of caches, the processors 201-1 to 201-m, 202-1 to 202-n snoop about the processor bus and manage the state of the data stored in the caches. The caches 205-1 to 205-m, 206-1 to 206-n are assumed to use the copy-back cache scheme.

In the second embodiment, it is assumed that the caches in the processors are managed in three states (M S I): Modified, Shared, and Invalid. In the multiprocessor of the second embodiment, when data change takes place on the cache of a processor, the occurrence of the data change must be observed by the bus bridges and reflected in the tag memories. In the case of a cache using the MESI scheme, however, when a processor has updated the data in a cache memory with the Exclusive state, the change of the data is not observed outside the processor and is not reflected in the tag memories.

Many processors that manage cache memories in four states, three states of M S I plus an Exclusive state, are in use. Even when such processors are used, the caches can be made to have three states of M S I spuriously by adding a circuit that returns a "Shared" response to the bus each time the processor issues a read request. Namely, when a "Shared" response is returned in response to a read request, the processor manages the read-in data with the "Shared" state. This causes the occurrence of a data change to be observed outside the processor. Therefore, even when processors using a general MESI protocol are adopted, a multiprocessor system that manages the caches in three states of M S I spuriously can be realized.

FIG. 16 shows a three state transition diagram of a cache block. The meaning of each state, the process when a load instruction is being executed, and the process when a store instruction is being executed are as follows:

<I> Invalid (I)

(I-1) Indicates that the data in the cache block is invalid (I-2) The initial value when the cache memory becomes operational.

(I-3) When a load instruction is executed, load miss results, and a read request <RB: Read Burst> is issued to the bus. When the read request is completed, the state is changed to "Shared" state.

(I-4) When a store instruction is executed, store miss results, and a read with invalidation request <RWITM: Read With Intent to Modify> is issued to the bus. When the read with invalidation request is completed, the state is changed to "Modified" state.

<II> Shared (S)

(II-1) Indicates that the data in the cache block is valid. The data is the same a in the memory.

(II-2) When a load instruction is executed, load hit will result and neither a bus request nor state transition occurs.

(II-3) When a store instruction is executed, store hit results and an invalidation request <DC: Data Claim> is issued to the bus. When the invalidation request is completed, the state is changed to "Modified" state.

(II-4) When the replacement of a cache block with 'Shared" state occurs, or when an invalidate request or a read request with invalidation on the bus is received, a bus request is not issued and the state is changed to "Invalid" state.

(II-5) When a read request is received, neither a bus request nor state transition occurs.

<III> Modified (M)

(III-1) Indicates that the data in the cache block is valid. The data stored in the memory is invalid (that is, only the data stored in the cache block is valid)

(III-2) When a load instruction is executed, load hit results and neither a bus request nor state transition occurs.

(III-3) When a store instruction is executed, store hit results and neither a bus request nor state transition occurs.

(III-4) When cache block replacement takes place, and when a read request with invalidation on the bus is received, a write request <WB: Write Burst> is issued to the bus, the data is written back into the memory, and the state is changed to "Invalid" state.

(III-5) When a read request is received, a write request <WB: Write Burst> is issued to the bus, the data is written back into the memory, and the state is changed to "Shared" state.

(III-6) When a cache block of a processor is in this state, the other processors never have the corresponding cache block with either shared state or Modified state. Therefore, an invalidate request is never received.

Explained next will be the control of memory tags in the second embodiment. FIG. 17 is a memory tag state transition diagram.

A memory tag has a bit of information per a cache block. Namely, it has two states (Valid and Invalid), which have the following meanings:

Valid: None of the processors in the system have the corresponding data in the caches with "Modified" state. Namely, the data stored in the main memory is valid.

Invalid: Any one of the processors in the system has the corresponding data in the cache with "Modified" state. Namely, the data in the main memory is invalid.

When the caches become operational during the system start up sequence, all the cache blocks have Invalid state. At that time, all the memory tags have Valid state.

In the cache state transition of FIG. 16, only when the state changes to "Modified" state, either an invalidate request or a read request with invalidation is issued to the bus. Therefore, the state of a memory tag changes to "Invalid" when an invalidate request or a read request with invalidation is issued to the bus. And the state of a memory tag changes to "Valid" when a write request is issued to the bus.

The operation of the second embodiment will be explained with reference to a flowchart.

Explained here will be each of the operations in the cases where the processor 201-1 issues (1) a read request, (2) a read request with invalidation, (3) an invalidate request, and (4) write request.

(1) Read request

The flow of processing in a case where processor 201-1 issues a read request is shown in the flowchart in FIG. 18. The processes enclosed by broken lines are the processes executed by the bus bridge 207 or 208.

First, the processor 201-1 issues a read request transaction to the processor bus 203 (step E1).

In response to the transaction, the individual processors 201-2 to 201-w connected to the processor bus 203 judge whether or not they have the requested data in the caches 205-2 to 205-8 with Modified state (step E2). If any one of the processors has the requested data with Modified state, the processor having the requested data makes a retry response and interrupts the read request (step E3). Then, the processor having the requested data writes back the requested modified-state data into the main memory using a write request (this is a normal operation of a snoop-type processor). Thereafter, the processor 201-1 reissues a read request.

In the bus bridge 207, the processor bus input/output controller 221 takes the read request issued to the processor bus 203 (step E4). As in the aforementioned steps E2 and s3, when the other processors connected to the common processor bus 203 makes a retry response to the read request, the read request is discarded by the bus bridge 207 at that time.

In the bus bridge 207, the processor bus address comparator 223 judges whether the received read request is in the range of the main memory 210 (local access) or in the other range (in the range of the main memory 211 in the configuration of FIG. 12 (remote access)) with reference to the address indicating the target data (step E5).

The tag memory input/output circuit 226 reads the value of the memory tag for the target address of the read request, and judges whether or not the data in the main memory 210 is Valid (step E6).

Because the process of judging the value of the memory tag is meaningful only in the case of local access, the reading of the tag memory may be started after the processor bus address comparator 223 has judged that the read request is for local access. In this case, the tag memory input/output circuit 226 receives the judgment result of the processor bus address comparator 223 and starts access to the tag memory 214. For higher-speed operation, however, the tag memory input/output circuit 226 may read the data from the tag memory according to the notice (including the target address) of acceptance of the read request from the processor bus input/output controller 221 and starts judgment without waiting for the judgment result of the processor bus address comparator 223.

If the comparison result of the processor bus address comparator 223 has shown remote access, or when the memory tag indicates Invalid, the system input/output controller 222 issues the read request obtained via the processor bus input/output controller 221 to the system bus 209 (step E7).

If the address comparison result of the processor bus address comparator 223 has shown local access and the memory tag indicates Valid, the main memory control input/output circuit 224 informs the memory controller 212 of the read request. The memory controller 212 reads the relevant data from the main memory 210, and outputs it to the main memory control input/output circuit 224. The read-out data is supplied to the processor 201-1 via the main memory control input/output circuit 224, the processor bus input/output controller 221, and the processor bus 203 (step E8).

For higher-speed operation, the main memory control input/output circuit 224 may start read control of the main memory 210 without waiting for the address comparison at the processor bus address comparator 223 and the memory tag judgment at the tag memory input/output circuit 226, as in the case of accessing the tag memory 214.

In this case, the main memory control input/output circuit 224 accesses the main memory 210 on the receipt of a read request, and the processor bus input/output controller 221 may determine whether to output the data to the processor bus 203.

The read request issued to the system bus 209 (step E7) is taken by the system bus input/output controller 222 of the bus bridge 208 (step E9).

The bus bridge 208 causes the processor bus address comparator 225 to judge whether the received read request is in the range of the main memory 211 (local access) or in the other range (remote access) with reference to the address indicating the target data (step E10).

When the address is determined to be a local access at step E10, the tag memory input/output circuit 226 reads the memory tag for the target address of the read request from the tag memory 215, and judges whether or not the data in the main memory 211 is Valid (step E11).

Because the process of checking the value of the memory tag is meaningful only in the case of local access, the tag memory access may be started after the system bus address comparator 225 has judged that the read request is for local access. In this case, the tag memory input/output circuit 226 receives the judgment result from the system bus address comparator 225 and starts access to the tag memory 215. For higher-speed operation, however, the tag memory input/output circuit 226 may read the data from the tag memory according to the notice (including the target address) of acceptance of the read request from the system bus input/output controller 222 and starts judgment without waiting for the judgment result of the system bus address comparator 225.

If the comparison result of the system bus address comparator 225 is remote address, or when the memory tag indicates Invalid, the processor bus input/output controller 221 issues to the processor bus 204 the read request obtained via the system bus input/output controller 222 (step E12).

If the address comparison result of the processor bus address comparator 223 is local access and the memory tag indicates Valid, the main memory control input/output circuit 224 informs the memory controller 213 of the read request. The memory controller 213 reads the relevant data from the main memory 211, and outputs it to the main memory control input/output circuit 224. The read-out data is supplied to the processor 201-1 via the main memory control input/output circuit 224 and system bus input/output controller 222 of the bus bridge 208, the system bus 209, the system bus input/output controller 222 and the processor bus input/output controller 221 of the bus bridge 207, and the processor bus 203 (step E13).

For higher-speed operation, the main memory control input/output circuit 224 may start read control of the main memory 211 without waiting for the address comparison at the system bus address comparator 225 and the memory tag judgment at the tag memory input/output circuit 226, as in the case of accessing the tag memory 215.

In this case, the main memory control input/output circuit 224 accesses the main memory 211 on the receipt of the read request, and the system bus input/output controller 222 may determine whether to output the data to the system bus 209.

The read request issued to the processors bus 204 at step E12 is snooped about by the processors 202-1 to 202-n. The processors 202-1 to 202-n check to see if their caches 206-1 to 206-n hold the read-requested data with Modified state. If a processor has, the processor makes a retry response, interrupts the read request, and writes back the relevant data into the main memory using a write request (step E14).

The processor 201-1 reissues the read request, so that it can read the data copied back in the main memory.

In the second embodiment, to simplify the explanation, only two bus bridges 207, 208 are connected to the system bus 209. Therefore, when it is judged to be remote access at step E10, it is certain that any one of the processors 202-1 to 202-n holds the data in the Modified state in its cache. when another bus bridge or I/O device is connected to the system bus 209, there may be a case where none of the processors 202-1 to 202-n retain the data with the Modified state in their caches. In this case, when a read request is issued to the processor has 204 at step E12, no processors reply. As compared with the first embodiment, the second embodiment can reduce the size of tag memories but has the disadvantage of always executing step E12.

(2) Read request with invalidation

The flow of processing in a case where the processor 201-1 issues a read request with invalidation is shown in the flowchart of FIG. 19. As in FIG. 18, the processes enclosed by broken lines are executed by the bus bridge 207 or 208.

Since the process of a read request with invalidation is generally the same as that of the above-described read request, explanation will be centered on the difference between them.

In the process of the aforementioned read request, the read request is not delivered through the system bus 209 if the requested address is for the main memory 210 (local memory) and the tag memory indicates Valid.

In contrast, a read with invalidate request must be delivered to all the processors so that all the processors other than the processor 201-1 discard the relevant data in its caches. The tag memory has no information about whether or not a cache has the relevant data with Shared state.

Therefore, when receiving the read request with invalidation at the processor bus input/output controller 221 (step F4), the bus bridge 207 unconditionally issues a read request with invalidation to the system bus 209 via the system bus input/output controller 222 (step F9).

In addition, the corresponding memory tag is set Invalid (step F8) if the target address is for the main memory 210 (step F5, LOCAL ACCESS) and the corresponding memory tag is Invalid (step F6, VALID).

When receiving the read request with invalidation at the system bus input/output controller 222 (step F10), the bus bridge 208 unconditionally issues a read request with invalidation to the processor bus 204 via the processor bus input/output controller 221 (step F15).

In addition, the corresponding memory tag is set Invalid (step F14) if the target address is for t he main memory 211 (step F11, LOCAL ACCESS) and the corresponding memory tag is Invalid (step F12, VALID).

At step F16, the read request with invalidation issued to the processor bus 204 is snooped about by the processors 202-1 to 202-n. The processors 202-1 to 202-n check to see if their caches 206-1 to 206-n hold the read-requested data with Modified state. If a processor has, the processor makes a retry response, interrupts the read with invalidation request, and writes back the relevant data into the main memory. The processors 202-1 to 202-n change the state of the relevant cache block to Invalid.

(3) Invalidate request

Figure 20:
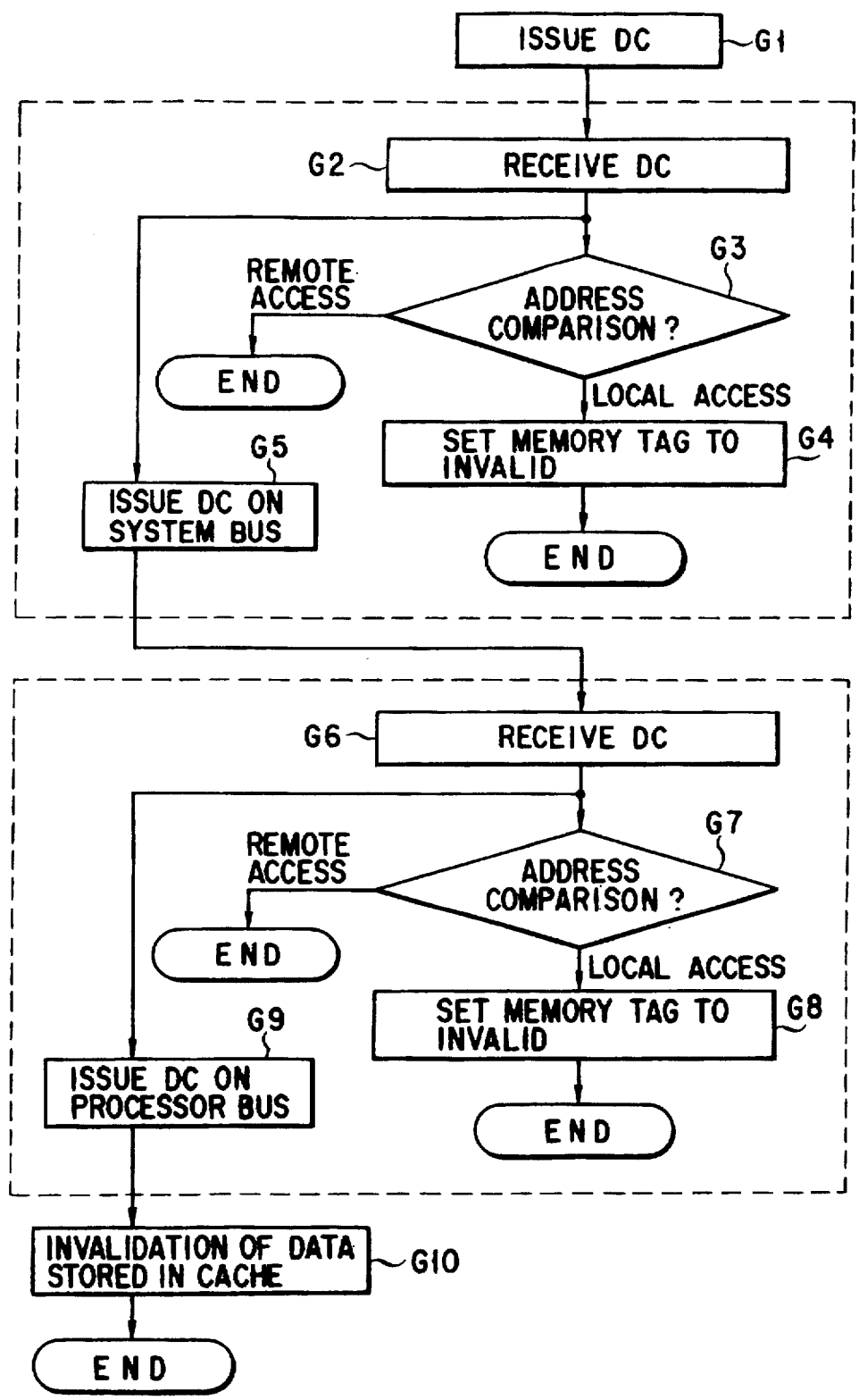
FIG. 20 is a flowchart for the processing in a case where an invalidate request is issued in the multiprocessor system of FIG. 12.

The flow of processing in a case where the processor 201-1 has issues an invalidate request is shown in the flowchart in the FIG. 20. As in FIG. 18, the processes enclosed by broken lines are executed by the bus bridge 207 or 208.

Since the process of an invalidate request is generally the same as that of the above-described read request with invalidation, explanation will be centered on the difference between them.

An invalidate request is issued when the data exists in the cache 105-1 with Shared state. It means that the corresponding memory tag of the tag memory is Valid.

When receiving the invalidate request at the processor bus input/output controller 221 (step G2), the bus bridge 207 unconditionally issues an invalidate request to the system bus 209 via the system bus input/output controller 222 (step G5).

Similarly, when receiving the invalidate request at the system bus input/output controller 222 (step G6), the bus bridge 208 unconditionally issues an invalidate request to the processor bus 204 via the processor bus input/output controller 221 (step G9).

Within the bus bridge 207, if the address comparison result at the processor bus address comparator 223 is remote access, the bus bridge 207 terminates the process because at step G5, an invalidate request has been issued already to the system bus 209. If the address comparison result at the processor bus address comparator 223 is local access, the bus bridge 207 causes the tag memory input/output circuit 226 to change the value of the memory tag corresponding to the relevant data to Invalid (step G4).

Within the bus bridge 208, if the address comparison result at the system bus address comparator 225 is remote access, the bus bridge 208 terminates the process because at step G9, an invalidate request has been issued already to the processor bus 204. If the address comparison result at the system bus address comparator 225 is local access, the bus bridge 208 causes the tag memory input/output circuit 226 to change the value of the memory tag corresponding to the relevant data to Invalid (step G8).

The invalidate request issued to the processor bus 204 is snooped about by the processors 202-1 to 202-n. If their caches 206-1 to 206-n hold the relevant data, the processors 202-1 to 202-n change the state of the cache block into Invalid (step G10).

(4) Write request

The flow of processing in a case where the processor 201-1 has issued a write request is shown in the flowchart in the FIG. 21. As in FIG. 18, the processes enclosed by broken lines are executed by the bus bridge 207 or 208.

Since the process of a write request is generally the same as that of the above-described read request with invalidation, explanation will be centered on the difference between them.

A write request is issued when the cache 201-1 has the data with Modified state.

The bus bridge 207 causes the processor bus input/output controller 221 to take the write request issued to the processor bus 203 (step H2).

The bus bridge 207 causes the processor bus address comparator 223 to judge whether the received write request is for local access or for remote access (step H3).

If the address comparison result of the processor bus address comparator 223 is remote access, the system bus input/output controller 222 issues the write request obtained via the processor bus input/output controller 221 to the system bus 209 (step H6).

If the address comparison result of the processor bus address comparator 223 is local access, the main memory control input/output circuit 224 will inform the memory controller 212 of the write request. The memory controller 212 executes write access to the main memory 210, and writes the relevant data. The tag memory input/output circuit 226 changes the memory tag corresponding to the target data into Valid (step H5). The change of memory tag at the tag memory input/output circuit 226 and a write request from the main memory control input/output circuit 224 to the main memory 210 can be executed in parallel.

At step H6, the write request issued to the system bus 209 is taken by the system bus input/output controller 222 of the bus bridge 208 (step H7).

The bus bridge 208 causes the system bus address comparator 225 to judge whether the received write request is for local access or for remote access (step H8).

If the address comparison result of the system bus address comparator 225 is remote access, the process is terminated. If the address comparison result of the system bus address comparator 225 is local access, the main memory control input/output circuit 224 will inform the memory controller 213 of the write request. The memory controller 213 executes write access to the main memory 211, and writes the relevant data. The tag memory input/output circuit 226 changes the memory tag corresponding to the target data into Valid (step H10). The change of memory tag at the tag memory input/output circuit 226 and a write request from the main memory control input/output circuit 224 to the main memory 211 can be executed in parallel.

When the bus bridges (bus interface controllers) 207, 208 have sensed a read request or a read request with invalidation issued onto the bus, they judge whether or not the target memory address is for local access. If it is for local access, they check the value of the memory tag. At this time, if the value of the memory tag indicates Valid, the data will be read from the main memory and respond to the read request. Namely, the process can be completed without waiting for the processors, response in the system. If the value indicates Invalid, this means that there is a processor having the data with Modified state. Issuing a transaction to the system bus forces the relevant processor to make a response.

As is explained described above, it is possible to provide cache coherency control using a multi-level snooping scheme and high-speed latency from the main memory. Additionally, the tag memories 214, 215 are required to have as small a memory capacity as is sufficient for the respective main memories. Therefore, as compared with the first embodiment, the memory capacity of the tag memories can be reduced remarkably.

As described above, with the present invention, a high-speed memory subsystem can be constructed using hardware by providing a bus bridge containing a controller which makes a response to coherency control of caches with reference to the tag information stored in the tag memories and which, when the tag information indicates "Modified", stops the data read from the main memory, and sends the correct data to the requesting processor after the copy-back process of the modified block has been completed. This makes a large cache memory such as L3 cache unnecessary, and enables the data read from the main memory to be transferred at a high speed to the requesting processor without waiting for the response of coherency control of the other L3 cache.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A multiprocessor system comprising:
   a plurality of nodes; and
   a system bus for connecting said plurality of nodes to each other, wherein each of said plurality of nodes comprises:
      one or more processors, each of said one or more processors having a cache memory;
      a processor bus for connecting said one or more processors to each other;
      a main memory having allocated a specific part of an address space shared by said plurality of nodes, for storing data n data blocks;
      a tag memory for storing tag information for each data block stored in each said main memory of each one of said plurality of nodes, the tag information indicating whether or not each data block is invalidated by any one of said one or more processors in any one of said plurality of nodes other than a present node; and
      a controller provided between said system bus and said processor bus in the said present node, comprises:
         determining means responsive to a data access request issued from one of said one or more processors of said plurality of nodes, for determining whether or not data requested by the data access request is stored in said main memory of said present node; and
         control means for performing control processing of the requested data according to at least one of the determination by said determining means and the tag information.

2. A multiprocessor system according to claim 1, wherein said control means accesses said main memory and sends the requested data when the data access request indicates a data read request, said determining means determines that the requested data is stored in said main memory of said present node, and the tag information corresponding to the requested data indicates that the requested data is not retained in a modified state in the cache memory of said processor of said node other than said present node.

3. A multiprocessor system according to claim 1, wherein said control means issues a read request to said bus when the data access request indicates a data read request and said determining means determines the requested data is not stored in said main memory of said present node.

4. A multiprocessor system according to claim 3, wherein said control means, in response to a read request issued to said bus, performs a control processing of the requested data according to at least one determination by said determining means and the tag information.

5. A multiprocessor system according to claim 1, wherein said control means issues a read request to said bus when the data access request indicates a data read request and tag information corresponding to the requested data indicates that the requested data is retained with a modified state in the cache memory of said processor of said node other than said present node.

6. A multiprocessor system according to claim 5, wherein said control means, in response to a read request issued to said bus, performs a control processing of the requested data according to at least one determination by said determining means and the tag information.

7. A multiprocessor system comprising:
   a plurality of nodes; and
   a system bus for connecting said plurality of nodes to each other, wherein each of said plurality of nodes comprises:
      one or more processors, each of said one or more processors having a cache memory;
      a processor bus for connecting said one or more processors to each other;
      a main memory having allocated a specific part of an address space shared by said plurality of nodes, for storing data in data blocks;
      a tag memory for storing tag information for each data block stored in said main memory of a present node, the tag information indicating whether each data block is valid or invalid; and
      a controller provided between said system bus and said processor bus in the said present node comprises:

determining means to a data access request issued from one of said one or more processors of said plurality of nodes, for determining whether or not data requested by the data access request is stored in said main memory of said present node; and control means for performing control processing of the requested data according to at least one of the determination by said determining means and the tag-information.

8. A multiprocessor system according to claim 7, wherein said control means accesses said main memory and sends the requested data when the data access request indicates a data read request, said determining means determines that the requested data is stored in said main memory of said present node, and the tag information corresponding to the requested data indicates that the requested data is valid.

9. A multiprocessor system according to claim 7, wherein said control means issues a read request to said bus when the data access request indicates a data read request and said determining means determines that the requested data is stored in said main memory of said present node.

10. A multiprocessor system according to claim 9, wherein said control means, in response to a read request issued to said bus, performs a control processing of the requested data according to at least one determination by said determining means and the tag information.

11. A multiprocessor system according to claim 7, wherein said control means issues a read request to said bus when the data access request indicates a data read request and tag information indicates that the requested data is invalid.

12. A multiprocessor system according to claim 11, wherein said control means, in response to a read request issued to said bus, performs a control processing of the requested data according to at least one determination by said determining means and the tag information.

13. A data control method in a node which is adapted to a multiprocessor system comprising a plurality of nodes and a bus for connecting said plurality of nodes to each other, each of said plurality of nodes comprising one or more processors, each of said one or more processors having a cache memory, a memory having allocated a specific part of an address space shared by said plurality of nodes for storing data in data blocks and a tag memory for storing tag information for each data block stored in each said main memory of each one of said plurality of nodes, the tag information indicating whether or not each data block is invalidated by any one of said one or more processors in any one of said plurality of nodes other than a present node, said control method comprising the steps of:

sensing a data access request issued from one of said one or more processors;

responding to the sensing of the data access request and determining whether or not a data requested by the data access request is stored in said main memory of said present node;

responding to the sensing of the data access request and referring to the tag information stored in said tag memory; and executing control processing of the requested data according to at least one of the determination and the tag information.

14. A data control method in a node which is adapted to a multiprocessor system comprising a plurality of nodes and a bus for connecting said plurality of nodes to each other, each of said plurality of nodes comprising one or more processors, each of said one or more processors having a cache memory, a main memory having allocated a specific part of an address space shared by said plurality of nodes for storing data in data blocks and a tag memory for storing tag information for each data block stored in said main memory of a present node, the tag information indicating whether each data block is valid or invalid, said control method comprising the steps of:

sensing a data access request issued from one of said one or more processors;

responding to the sensing of the data access request and determining whether or not a data requested by the data access request is stored in said main memory of said present node;

responding to the sensing of the data access request and referring to the tag information stored in said tag memory; and executing control processing of the requested data according to at least one of the determination and the tag information.

15. A multiprocessor system comprising:

a plurality of nodes; and a system bus for connecting said plurality of nodes to each other, wherein each of said plurality of nodes comprises:

one or more processors, each of said one or more processors having a cache memory;

a processor bus for connecting said one or more processors to each other;

a main memory having allocated a specific part of an address space shared by said plurality of nodes, for storing data in data blocks;

a tag memory for storing tag information for each data block stored in each said main memory of each one of said plurality of nodes, the tag information indicating whether or not contents of each data block are inconsistent with contents of a cache of any one of said one or more processors in any one of said plurality of nodes other than a present node; and a controller provided between said system bus and said processor bus in the said present node, comprises:

determining means responsive to a data access request issued from one of said one or more processors of said plurality of nodes, for determining whether or not data requested by the data access request is stored in said main memory of said present node; and control means for performing control processing of the requested data according to at least one of the determination by said determining means and the tag information.

16. A multiprocessor system comprising:

a plurality of nodes; and a system bus for connecting said plurality of nodes to each other, wherein each of said plurality of nodes comprises:

one or more processors, each of said one or more processors having a cache memory;

a processor bus for connecting said one or more processors to each other;

a main memory having allocated a specific part of an address space shared by said plurality of nodes, for storing data in data blocks;

a tag memory for storing tag information for each data block stored in said main memory of a present node, the tag information indicating whether or not contents of each data block are inconsistent with contents of a cache of any one of said one or more processors in any one of said plurality of nodes; and a controller provided between said system bus and said processor bus in the said present node, comprises:

determining means responsive to a data access request issued from one of said one or more processors of said plurality of nodes, for determining whether or not data requested by the data access request is stored in said main memory of said present node; and control means for performing control processing of the requested data according to at least one of the determination by said determining means and the tag information.

17. A data control method in a node which is adapted to a multiprocessor system comprising a plurality of nodes and a bus for connecting said plurality of nodes to each other, each of said plurality of nodes comprising one or more processors, each of said one or more processors having a cache memory, a memory having allocated a specific part of an address space shared by said plurality of nodes for storing data in data blocks and a tag memory for storing tag information for each data block stored in each said main memory of each one of said plurality of nodes, the tag information indicating whether or not contents of each data block are inconsistent with contents of a cache of any one of said one or more processors in any one of said plurality of nodes other than a present node, said control method comprising the steps of:

sensing a data access request issued from one of said one or more processors;

responding to the sensing of the data access request and determining whether or not a data requested by the data access request is stored in said main memory of said present node;

responding to the sensing of the data access request and referring to the tag information stored in said tag memory; and executing control processing of the requested data according to at least one of the determination and the tag information.

18. A data control method in a node which is adapted to a multiprocessor system comprising a plurality of nodes and a bus for connecting said plurality of nodes to each other, each of said plurality of nodes comprising one or more processors, each of said one or more processors having a cache memory, a main memory having allocated a specific part of an address space shared by said plurality of nodes for storing data in data blocks and a tag memory for storing tag information for each data block stored in said main memory of a present node, the tag information indicating whether or not contents of each data block are inconsistent with contents of a cache of any one of said one or more processors in any one of said plurality of nodes, said control method comprising the steps of:

sensing a data access request issued from one of said one or more processors;

responding to the sensing of the data access request and determining whether or not a data requested by the data access request is stored in said main memory of said present node;

responding to the sensing of the data access request and referring to the tag information stored in said tag memory; and executing control processing of the requested data according to at least one of the determination and the tag information.

* * * * *

UNITED STATES PATENT AND TRADEMARK OFFICE
CERTIFICATE OF CORRECTION

PATENT NO. : 5,829,032
DATED : October 27, 1998
INVENTOR(S) : Hiroshi Komuro et al.

It is certified that error appears in the above-identified patent and that said Letters Patent is hereby corrected as shown below:

Claim 1, Col. 23, line 67, "n" should read --in--.

Claim 7, Col. 24, line 67, after "node", insert --,--.

Claim 7, Col. 25, line 9, "tag-information" should read --tag information--.

Signed and Sealed this

Twenty-third Day of November, 1999

Attest:

Q. TODD DICKINSON

*Attesting Officer*         *Acting Commissioner of Patents and Trademarks*